(12) United States Patent
Lawson et al.

(10) Patent No.: US 9,477,936 B2
(45) Date of Patent: Oct. 25, 2016

(54) CLOUD-BASED OPERATOR INTERFACE FOR INDUSTRIAL AUTOMATION

(75) Inventors: Douglas C. Lawson, Silverado, CA (US); Douglas J. Reichard, Fairview Park, OH (US); Joseph A. Harkulich, Willoughby, OH (US); Rainer Hessmer, Rancho Santa Margarita, CA (US); Sujeet Chand, Brookfield, WI (US); David W. Farchmin, Grafton, WI (US); Michael John Pantaleano, Willoughby, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 700 days.

(21) Appl. No.: 13/608,821

(22) Filed: Sep. 10, 2012

(65) Prior Publication Data

US 2013/0211559 A1 Aug. 15, 2013

Related U.S. Application Data

(60) Provisional application No. 61/587,531, filed on Feb. 9, 2012, provisional application No. 61/642,964, filed on May 4, 2012.

(51) Int. Cl.
*G06F 15/173* (2006.01)
*G06Q 10/06* (2012.01)
*H04L 12/26* (2006.01)

(52) U.S. Cl.
CPC ......... *G06Q 10/06315* (2013.01); *H04L 43/04* (2013.01)

(58) Field of Classification Search
CPC ............. H04L 43/045; H04L 43/0817; G06F 11/3013; G06F 11/321

USPC ........................................................ 709/224
See application file for complete search history.

(56) References Cited

U.S. PATENT DOCUMENTS 5,014,317 A 5/1991 Kita et al.
5,122,948 A 6/1992 Zapolin
(Continued)

FOREIGN PATENT DOCUMENTS

CN 101114160 1/2008
CN 101536002 9/2009
(Continued)

OTHER PUBLICATIONS

Office Action dated Jun. 18, 2014 for U.S. Appl. No. 13/725,578, 13 pages.
(Continued)

*Primary Examiner* — Jason Recek
(74) *Attorney, Agent, or Firm* — Amin, Turocy & Watson, LLP

(57) ABSTRACT

A cloud-based operator interface system is provided that runs as a cloud service on a cloud platform. The cloud-based operator interface system collects industrial data from one or more industrial systems via respective cloud gateway devices. A set of predefined operator interface screens are stored on cloud storage associated with the operator interface system, and delivered to authorized Internet-capable client devices upon request. The industrial data received from the cloud gateways can be delivered to the client devices from the cloud platform via the operator interface screens. Additional cloud-side services can correlate and analyzes the industrial data on the cloud platform to facilitate additional reporting, alarming, and notification features.

20 Claims, 12 Drawing Sheets

(56) References Cited

U.S. PATENT DOCUMENTS

| | | |
|---|---|---|
| 5,199,009 A | 3/1993 | Svast |
| 5,611,059 A | 3/1997 | Benton et al. |
| 5,612,869 A | 3/1997 | Letzt et al. |
| 5,682,460 A | 10/1997 | Hyziak et al. |
| 5,710,885 A | 1/1998 | Bondi |
| 5,844,794 A | 12/1998 | Keeley |
| 5,845,149 A | 12/1998 | Husted et al. |
| 5,856,931 A | 1/1999 | McCasland |
| 5,978,568 A | 11/1999 | Abraham et al. |
| 6,167,337 A | 12/2000 | Haack |
| 6,175,770 B1 | 1/2001 | Bladow |
| 6,175,801 B1 | 1/2001 | Millington |
| 6,199,068 B1 | 3/2001 | Carpenter |
| 6,279,113 B1 | 8/2001 | Vaidya |
| 6,282,455 B1 | 8/2001 | Engdahl |
| 6,324,607 B1 | 11/2001 | Korowitz et al. |
| 6,381,502 B1 | 4/2002 | Rudder et al. |
| 6,400,996 B1 | 6/2002 | Hoffberg et al. |
| 6,412,032 B1 | 6/2002 | Neet et al. |
| 6,437,692 B1 | 8/2002 | Petite et al. |
| 6,457,024 B1 | 9/2002 | Felsentein et al. |
| 6,463,338 B1 | 10/2002 | Neet |
| 6,535,926 B1 | 3/2003 | Esker |
| 6,624,388 B1 | 9/2003 | Blankenship et al. |
| 6,640,145 B2 | 10/2003 | Hoffberg et al. |
| 6,651,062 B2 | 11/2003 | Ghannam et al. |
| 6,675,226 B1 | 1/2004 | Nair et al. |
| 6,686,838 B1 | 2/2004 | Rezvani et al. |
| 6,691,159 B1 | 2/2004 | Grewal et al. |
| 6,708,074 B1 | 3/2004 | Chi et al. |
| 6,714,974 B1 | 3/2004 | Machida |
| 6,728,262 B1 | 4/2004 | Woram |
| 6,732,165 B1 | 5/2004 | Jennings, III |
| 6,732,191 B1 | 5/2004 | Baker et al. |
| 6,774,598 B1 | 8/2004 | Kohler |
| 6,801,920 B1 | 10/2004 | Wischinski |
| 6,819,960 B1 | 11/2004 | McKelvey et al. |
| 6,891,850 B1 | 5/2005 | Vandesteeg et al. |
| 6,895,532 B2 | 5/2005 | Raynham |
| 6,904,600 B1 | 6/2005 | James et al. |
| 6,907,302 B2 | 6/2005 | Karbassi |
| 6,920,502 B2 | 7/2005 | Araujo et al. |
| 6,965,802 B2 | 11/2005 | Sexton |
| 6,968,242 B1 | 11/2005 | Hwu et al. |
| 6,970,913 B1 | 11/2005 | Albert et al. |
| 6,982,953 B1 | 1/2006 | Swales |
| 7,032,045 B2 | 4/2006 | Kostadinov |
| 7,085,814 B1 | 8/2006 | Gandhi et al. |
| 7,103,428 B2 | 9/2006 | Varone et al. |
| 7,133,900 B1 | 11/2006 | Szeto |
| 7,149,792 B1 | 12/2006 | Hansen et al. |
| 7,151,966 B1 | 12/2006 | Baier et al. |
| 7,203,560 B1 | 4/2007 | Wylie et al. |
| 7,210,095 B1 | 4/2007 | Mor |
| 7,233,830 B1 | 6/2007 | Callaghan et al. |
| 7,275,037 B2 | 9/2007 | Lauer |
| 7,277,865 B1 | 10/2007 | Silverstone et al. |
| 7,289,994 B2 | 10/2007 | Nixon et al. |
| 7,298,275 B2 | 11/2007 | Brandt et al. |
| 7,310,344 B1 | 12/2007 | Sue |
| 7,383,155 B2 | 6/2008 | Rosam et al. |
| 7,412,548 B2 | 8/2008 | Sichner |
| 7,478,010 B2 | 1/2009 | Hashemian |
| 7,480,728 B2 | 1/2009 | Evans |
| 7,539,724 B1 * | 5/2009 | Callaghan ............... 709/205 |
| 7,734,590 B2 | 6/2010 | Chand et al. |
| 8,150,959 B1 | 4/2012 | Bezdicek et al. |
| 8,353,012 B2 | 1/2013 | Del Real |
| 8,392,845 B2 | 3/2013 | Cahill et al. |
| 8,451,753 B2 | 5/2013 | Vanga et al. |
| 8,468,272 B2 | 6/2013 | Giroti |
| 8,686,871 B2 | 4/2014 | Jensen et al. |
| 9,024,955 B2 | 5/2015 | Ramarao et al. |
| 2002/0004798 A1 | 1/2002 | Babula et al. |
| 2002/0016839 A1* | 2/2002 | Smith ............... G06Q 40/00 709/224 |
| 2002/0042756 A1 | 4/2002 | Kumar et al. |
| 2002/0046239 A1 | 4/2002 | Stawikowski et al. |
| 2002/0049833 A1 | 4/2002 | Kikinis |
| 2002/0065898 A1 | 5/2002 | Leontiev et al. |
| 2002/0068983 A1 | 6/2002 | Sexton |
| 2002/0073236 A1 | 6/2002 | Helgeron et al. |
| 2002/0077711 A1 | 6/2002 | Nixon et al. |
| 2002/0094588 A1 | 7/2002 | Fan et al. |
| 2002/0107904 A1 | 8/2002 | Talluri et al. |
| 2002/0156872 A1 | 10/2002 | Brown |
| 2002/0156926 A1 | 10/2002 | Batke et al. |
| 2002/0161745 A1 | 10/2002 | Call |
| 2002/0169993 A1 | 11/2002 | Woods et al. |
| 2003/0004937 A1 | 1/2003 | Salmenkaita et al. |
| 2003/0009253 A1 | 1/2003 | McIntyre et al. |
| 2003/0009572 A1 | 1/2003 | Thurner |
| 2003/0011467 A1 | 1/2003 | Suomela |
| 2003/0014149 A1 | 1/2003 | Kreidler et al. |
| 2003/0023336 A1 | 1/2003 | Kreidler et al. |
| 2003/0051074 A1 | 3/2003 | Edwards |
| 2003/0056224 A1 | 3/2003 | Stone |
| 2003/0105535 A1 | 6/2003 | Rammler |
| 2003/0105585 A1 | 6/2003 | Ukita |
| 2003/0109942 A1 | 6/2003 | Yeh et al. |
| 2003/0120817 A1 | 6/2003 | Ott et al. |
| 2003/0156639 A1 | 8/2003 | Liang |
| 2003/0167238 A1 | 9/2003 | Zeif |
| 2003/0167449 A1 | 9/2003 | Warren et al. |
| 2003/0177169 A1 | 9/2003 | Nutt et al. |
| 2003/0177201 A1 | 9/2003 | Shen |
| 2003/0208545 A1 | 11/2003 | Eaton et al. |
| 2003/0217100 A1 | 11/2003 | Kronk |
| 2003/0224769 A1 | 12/2003 | Solve et al. |
| 2003/0236576 A1 | 12/2003 | Resnick et al. |
| 2004/0111512 A1 | 6/2004 | Barth |
| 2004/0148039 A1 | 7/2004 | Farchmin et al. |
| 2004/0148187 A1 | 7/2004 | Boettcher et al. |
| 2004/0148383 A1 | 7/2004 | Gonsalves et al. |
| 2004/0214566 A1 | 10/2004 | Suzuki et al. |
| 2004/0215551 A1 | 10/2004 | Eder |
| 2004/0225629 A1 | 11/2004 | Eder |
| 2004/0267729 A1 | 12/2004 | Swaminathan et al. |
| 2005/0038528 A1 | 2/2005 | McKlvey et al. |
| 2005/0055429 A1 | 3/2005 | Abele |
| 2005/0080799 A1 | 4/2005 | Hamden et al. |
| 2005/0120112 A1 | 6/2005 | Wing et al. |
| 2005/0125441 A1 | 6/2005 | Clemens et al. |
| 2005/0149922 A1 | 7/2005 | Vincent |
| 2005/0209902 A1 | 9/2005 | Iwasaki et al. |
| 2006/0022048 A1 | 2/2006 | Johnson |
| 2006/0046712 A1 | 3/2006 | Shamp et al. |
| 2006/0149813 A1 | 7/2006 | Janik |
| 2006/0153089 A1 | 7/2006 | Silverman |
| 2006/0173873 A1 | 8/2006 | Prompt et al. |
| 2006/0253205 A1 | 11/2006 | Gardiner |
| 2007/0008129 A1 | 1/2007 | Soliman |
| 2007/0019641 A1 | 1/2007 | Pai et al. |
| 2007/0050206 A1 | 3/2007 | Whikehart et al. |
| 2007/0061018 A1 | 3/2007 | Callaghan et al. |
| 2007/0073850 A1 | 3/2007 | Callaghan et al. |
| 2007/0118560 A1 | 5/2007 | Bornhoevd et al. |
| 2007/0192213 A1 | 8/2007 | Wu et al. |
| 2007/0194097 A1 | 8/2007 | Jones |
| 2007/0247789 A1 | 10/2007 | Benson et al. |
| 2008/0027104 A1 | 1/2008 | Kephart |
| 2008/0125887 A1 | 5/2008 | Case |
| 2008/0155064 A1* | 6/2008 | Kosuge ............... E03F 7/00 709/219 |
| 2008/0189637 A1 | 8/2008 | Krajewski et al. |
| 2008/0208365 A1 | 8/2008 | Grgic et al. |
| 2008/0263514 A1* | 10/2008 | DeMesa ............... G06F 8/36 717/105 |
| 2009/0086692 A1 | 4/2009 | Chen |
| 2009/0088875 A1 | 4/2009 | Baier et al. |
| 2009/0089233 A1* | 4/2009 | Gach et al. ............... 706/45 |
| 2009/0089359 A1 | 4/2009 | Siorek et al. |
| 2009/0089682 A1 | 4/2009 | Baier |

(56) References Cited

U.S. PATENT DOCUMENTS

| | | |
|---|---|---|
| 2009/0109889 A1 | 4/2009 | Budampati et al. |
| 2009/0127325 A1 | 5/2009 | Macurek et al. |
| 2009/0210071 A1 | 8/2009 | Agrusa et al. |
| 2009/0210814 A1 | 8/2009 | Agrusa et al. |
| 2009/0216341 A1* | 8/2009 | Enkerud et al. ............... 700/17 |
| 2010/0076575 A1 | 3/2010 | Vasko et al. |
| 2010/0082129 A1 | 4/2010 | McGreevy et al. |
| 2010/0082453 A1 | 4/2010 | Speers et al. |
| 2010/0083232 A1 | 4/2010 | Chouinard et al. |
| 2010/0118895 A1 | 5/2010 | Radulescu |
| 2010/0153487 A1 | 6/2010 | Greven et al. |
| 2010/0192144 A1 | 7/2010 | Schmit |
| 2010/0241260 A1 | 9/2010 | Kilibarda et al. |
| 2010/0256795 A1 | 10/2010 | McLaughlin et al. |
| 2010/0257227 A1 | 10/2010 | McLaughlin |
| 2010/0257228 A1 | 10/2010 | Staggs et al. |
| 2010/0332008 A1 | 12/2010 | Knipfer et al. |
| 2011/0016058 A1 | 1/2011 | Pinchuk |
| 2011/0047230 A1 | 2/2011 | McGee |
| 2011/0276498 A1 | 11/2011 | Madhik |
| 2012/0054246 A1 | 3/2012 | Fischer |
| 2012/0072597 A1 | 3/2012 | Teather et al. |
| 2012/0083906 A1 | 4/2012 | Weatherhead et al. |
| 2012/0084400 A1* | 4/2012 | Almadi et al. ............... 709/219 |
| 2012/0089920 A1 | 4/2012 | Eick |
| 2012/0147894 A1 | 6/2012 | Mulligan et al. |
| 2012/0232876 A1 | 9/2012 | Misra |
| 2012/0262069 A1 | 10/2012 | Reed |
| 2012/0290104 A1 | 11/2012 | Holt et al. |
| 2012/0304007 A1 | 11/2012 | Hanks et al. |
| 2012/0306620 A1 | 12/2012 | Karaffa et al. |
| 2013/0012220 A1 | 1/2013 | Waris et al. |
| 2013/0018696 A1 | 1/2013 | Meldrum |
| 2013/0024542 A1 | 1/2013 | Keller et al. |
| 2013/0036198 A1 | 2/2013 | Galm et al. |
| 2013/0041705 A1 | 2/2013 | Hampapur et al. |
| 2013/0097710 A1 | 4/2013 | Basavapatna et al. |
| 2013/0107772 A1 | 5/2013 | Splitz et al. |
| 2013/0111034 A1 | 5/2013 | Upadhya |
| 2013/0117806 A1 | 5/2013 | Parthasarathy et al. |
| 2013/0138812 A1 | 5/2013 | Assuncao et al. |
| 2013/0138818 A1 | 5/2013 | Wolf |
| 2013/0145033 A1 | 6/2013 | Polla et al. |
| 2013/0182107 A1 | 7/2013 | Anderson |
| 2013/0191106 A1 | 7/2013 | Kephart et al. |
| 2013/0204982 A1 | 8/2013 | Kim et al. |
| 2013/0211547 A1 | 8/2013 | Buchdunger et al. |
| 2013/0212420 A1 | 8/2013 | Lawson et al. |
| 2013/0304237 A1 | 11/2013 | Schroeder et al. |
| 2013/0325545 A1 | 12/2013 | Mordvinova et al. |
| 2014/0047107 A1 | 2/2014 | Maturana et al. |
| 2014/0156032 A1 | 6/2014 | Jenkins et al. |
| 2014/0156584 A1 | 6/2014 | Motukuri |
| 2014/0279948 A1 | 9/2014 | Mahate et al. |
| 2014/0335480 A1 | 11/2014 | Asenjo et al. |
| 2014/0336785 A1 | 11/2014 | Asenjo et al. |
| 2014/0336786 A1 | 11/2014 | Asenjo et al. |
| 2014/0336795 A1 | 11/2014 | Asenjo et al. |
| 2014/0337000 A1 | 11/2014 | Asenjo et al. |
| 2015/0012763 A1* | 1/2015 | Cohen et al. ............... 713/310 |
| 2015/0019191 A1 | 1/2015 | Maturana et al. |
| 2015/0304193 A1 | 10/2015 | Ishii et al. |
| 2015/0378356 A1 | 12/2015 | Hefeeda et al. |

FOREIGN PATENT DOCUMENTS

| | | |
|---|---|---|
| CN | 101739007 | 6/2010 |
| CN | 102449567 A | 5/2012 |
| CN | 102927937 | 2/2013 |
| DE | 19834456 | 2/2000 |
| EP | 1209558 A2 | 5/1996 |
| EP | 1531373 A2 | 5/2005 |
| EP | 1686442 A1 | 8/2006 |
| EP | 1933214 | 6/2008 |
| EP | 2189900 A1 | 5/2010 |
| EP | 2293164 A1 | 3/2011 |
| EP | 2453326 | 5/2012 |
| EP | 2469466 | 6/2012 |
| EP | 2801938 | 11/2014 |
| EP | 2801940 | 11/2014 |
| EP | 2801941 | 11/2014 |
| WO | 0111586 A | 2/2001 |
| WO | 0169329 A2 | 9/2001 |
| WO | 0217131 | 2/2002 |
| WO | 03058506 A1 | 7/2003 |
| WO | 2008133715 | 11/2008 |
| WO | 2009046095 | 4/2009 |
| WO | 2011050482 | 5/2011 |
| WO | 2013007866 A1 | 1/2013 |

OTHER PUBLICATIONS

Office Action dated Aug. 19, 2014 for U.S. Appl. No. 13/615,195, 22 pages.
European Search Report dated Aug. 11, 2014 for European Application No. 14167706.2-1955, 7 pages.
European Search Report dated Aug. 11, 2014 for European Application No. 14167714.6-1955, 5 pages.
European Search Report dated Aug. 11, 2014 for European Application No. 14167626.2-1955, 9 pages.
European Search Report dated Aug. 11, 2014 for European Application No. 14167627.0-1955, 6 pages.
European Search Report dated Aug. 11, 2014 for European Application No. 14167703.9-1955, 7 pages.
European Search Report dated Aug. 11, 2014 for European Application No. 14167707.0-1955, 7 pages.
European Search Report dated Aug. 11, 2014 for European Application No. 14167708.8-1955, 5 pages.
European Search Report dated Aug. 11, 2014 for European Application No. 14167712.0-1955, 5 pages.
European Search Report dated Aug. 11, 2014 for European Application No. 14167511.6-1955, 6 pages.
Compuquest, Inc., SpreadMsg Lite—Data Capture, Scanning, Extraction & Rule Based Instant Messaging Software, http://web.archive.org/web/20020813080848/ http://www.compuquestinc.com/spmsgl.html, retrieved Jul. 21, 2006, 6 pages.
Office Action dated Dec. 27, 2004 for U.S. Appl. No. 10/162,315, 8 pages.
Office Action dated Jun. 15, 2005 for U.S. Appl. No. 10/162,315, 9 pages.
Office Action dated Sep. 09, 2005 for U.S. Appl. No. 10/162,315, 10 pages.
Vasudevan, a Web Services Primer, Apr. 4 2001, XML.com, http://webservices.xml.com/pub/a/ws/2001/04/04/webservices/index.html.
Office Action dated Mar. 6, 2006 for U.S. Appl. No. 10/162,315, 8 pages.
W3C, Web Services Description Language, http://www.w3.org/TR/wsd1, Mar. 15, 2001.
European Search Report dated Mar. 18, 2004 for European Patent Application Serial No. 03026339, 3 pages.
Compuquest, Inc., SPM-IM-Instant Messaging Client for SpreadMsg Wireless Messaging Software, http://www.compuquestinc.com/spmim.html, Aug. 13, 2002.
Compuquest, Inc., SpreadMsg Lite - Data Capture, Scanning, Extraction & Rule Based Instant Messaging Software, http://web.archive.org/web/200208130808481 http://www.compuquestinc.com/spmsgl.html.
International Business Machines Corporation, Cross platform instant messaging using web services, Research Disclosure, Kenneth Mason Publications, Hampshire, GB, vol. 458, No. 156, Jun. 2002.
Office Action dated Oct. 9, 2014 for U.S. Appl. No. 13/725,543, 10 pages.
Office Action dated Dec. 12, 2014 for U.S. Appl. No. 13/725,578, 24 pages.
Office Action dated Jan. 20, 2015 for U.S. Appl. No. 13/615,195, 22 pages.

(56) References Cited

OTHER PUBLICATIONS

Third Party Submission under 37 CFR 1.290 dated Nov. 21, 2014 for U.S. Appl. No. 14/087,873, 23 pages.
Office Action for U.S. Appl. No. 13/725,543 dated May 20, 2015, 15 pages.
Office Action for U.S. Appl. No. 13/608,850 dated Jun. 1, 2015, 38 pages.
Office Action for U.S. Appl. No. 13/677,060 dated Apr. 24, 2015, 54 pgs.
Office Action for U.S. Appl. No. 13/725,619 dated Jul. 17, 2015, 45 pages.
Office Action for U.S. Appl. No. 13/725,660 dated Aug. 18, 2015, 90 pgs.
Colombo, A.W., et al., "Factory of the Future: A Service-Oriented System of Modular, Dynamic Reconfigurable and Collaborative Systems," Artificial Intelligence Techniques for Networked Manufacturing Enterprises Management, Springer Series in Advanced Manufacuring 2010, pp. 459-481.
Colombo, Amando Walter, et al., "Towards the Factory of the Future: a Service-Oriented Cross-layer Infrastructure," ICT Shaping the World: A Scientific View, 2009, pp. 65-81.
Office Action for U.S. Appl. No. 13/677,060, dated Oct. 20, 2015, 48 pages.
Office Action for U.S. Appl. No. 13/615,195, dated Sep. 21, 2015, 19 pages.
Office Action for U.S. Appl. No. 13/725,660, dated Oct. 26, 2015, 79 pages.
Chinese Office Action for Chinese Application No. 2014101961985 dated Mar. 29, 2016, 18 pages.
Office Action dated Nov. 25, 2015 for U.S. Appl. No. 14/087,873, 57 pages.
Final Office Action for U.S. Appl. No. 13/725,619 dated Dec. 4, 2015, 21 pages.
Final Office Action for U.S. Appl. No. 13/615,195, dated Feb. 11, 2016, 19 pages.
Non-Final Office Action for U.S. Appl. No. 13/725,543, dated Feb. 2, 2016, 15 pages.
Non-Final Office Action for U.S. Appl. No. 13/725,660, dated Jan. 21 2016, 72 pages.
Final Office Action for U.S. Appl. No. 13/608,850, dated Dec. 9, 2015, 25 pages.
Office Action dated Nov. 24, 2015 for European Application No. 14167706.2-1955, 8 pages.
Office Action dated Nov. 24, 2015 for European Application No. 14167626.2-1955, 8 pages.
Office Action dated Sep. 22, 2015 for European Application No. 14167707.0-1955, 9 pages.
Notice of Allowance for U.S. Appl. No. 13/725,619 dated Mar. 31, 2016, 26 pages.
Non-Final Office Action for U.S. Appl. No. 13/677,060 dated Mar. 10, 2016, 66 pages.
Notice of Allowance for U.S. Appl. No. 13/725,660 dated Feb. 3, 2016, 47 pages.
Non-Final Office Action for U.S. Appl. No. 14/087,730 dated Mar. 11, 2016, 81 pages.
Non-Final Office Action for U.S. Appl. No. 14/087,821 dated Mar. 2, 2016, 86 pages.
Non-Final Office Action for U.S. Appl. No. 14/087,977 dated Mar. 17, 2016, 83 pages.
"Recursion Software, "Scada-Aware Mobile", Frisco, TX, Aug. 29, 2012 (accessed from<<http://www.emsenergyautomation.com/brochures/scada.pdf>> on Feb. 11, 2016)".
"Ars Technica, "Windows 7 themes: how to unlock them or create your own", Nov. 12, 2009 (accessed from<<http://arstechnica.com/information-technology/2009/11/unlock-hidden-windows-7-themesl on Mar. 8, 2016)".
Non-Final Office Action for U.S. Appl. No. 14/088,014 dated Mar. 22, 2016, 98 pages.
"Microsoft, "Sharing Outlook 2010 Contact\Notes/Field?", microsoft.com, Jun. 23, 2011 (accessed on Mar. 11, 2016 from http://answers.microsoft.com/en-us/office/forum/office_2010-outlook/sharing-outlook-2010-contactnotes-field/c7e74273-ff60-4da3-a3aa-ccb6cadcd25e?auth=1)".
Notice of Allowance for U.S. Appl. No. 13/608,850 dated Apr. 12, 2016, 37 pages.
Notice of Allowance for U.S. Appl. No. 14/087,873 dated Apr. 18, 2016, 26 pages.
Chinese Office Action for Chinese Application No. 201410196775.0 dated Apr. 5, 2016, 14 pages.
Chinese Office Action for Chinese Application No. 201410198289.2 dated Apr. 5, 2016, 18 pages.
Chinese Office Action for Chinese Application No. 201410196905.0 dated Apr. 5, 2016, 20 pages.
Chinese Office Action for Chinese Application No. 201410196127.5 dated Apr. 7, 2016 11 pages.
Chinese Office Action for Chinese Application No. 201410196114.8 dated Apr. 25, 2016, 20pages.
Chinese Office Action for Chinese Application No. 201410196525.7, dated May 5, 2016, 13 pages.
Chinese Office Action for Chinese Application No. 201410196775.0 dated May 5, 2016, 14 pages.
Non-Final Office Action for U.S. Appl. No. 14/088,011 dated May 12, 2016, 96 pages.
Office Action dated Jun. 21, 2016 for U.S. Appl. No. 13/615,195, 27 pages.
Final Office Action dated Jun. 17, 2016 for U.S. Appl. No. 13/725,543, 19 pages.
Office Action dated Jun. 17, 2016 for U.S. Appl. No. 14/087,970, 36 pages.
Final Office Action dated Jul. 13, 2016 for U.S. Appl. No. 14/087,977, 59 pages.
Final Office Action dated Jul. 15, 2016 for U.S. Appl. No. 14/088,014, 65 pages.
Non-Final Office Action dated Jul. 19, 2016 for U.S Appl. No. 14/087,922, 120 pages.
Chinese Office Action dated May 26, 2016 for Chinese Application No. 201410195780.X, 16 pages (including translation).
Extended European Search Report for European Patent Application Serial No. 16160604.1, dated Aug. 17, 2016, 9 pages.
Extended European Search Report for EP Patent Application Serial No. 16160611.6, dated Aug. 24, 2016, 10 pages.
Final Office Action for U.S. Appl.No. 14/087,730, dated Aug. 24, 2016, 37 pages.

\* cited by examiner

CLOUD-BASED OPERATOR INTERFACE FOR INDUSTRIAL AUTOMATION

RELATED APPLICATIONS

This application claims the benefit of U.S. Provisional Patent Application Ser. No. 61/587,531, filed on Feb. 9, 2012, and entitled "INDUSTRIAL AUTOMATION CLOUD COMPUTING SYSTEMS AND METHODS," and U.S. Provisional Patent Application Ser. No. 61/642,964, filed May 4, 2012, and entitled "CLOUD GATEWAY FOR INDUSTRIAL AUTOMATION INFORMATION." This application is also related to U.S. patent application Ser. No. 10/162,315, filed on Jun. 4, 2002 (which issued as U.S. Pat. No. 7,151,966 on Dec. 19, 2006), and entitled "SYSTEM AND METHODOLOGY PROVIDING OPEN INTERFACE AND DISTRIBUTED PROCESSING IN AN INDUSTRIAL CONTROLLER ENVIRONMENT." The entireties of these applications are incorporated herein by reference.

TECHNICAL FIELD

The subject application relates generally to industrial automation, and, more particularly, to a cloud-based operator interface system for remote monitoring and control of industrial systems.

BACKGROUND

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such platforms.

Industrial automation systems often include one or more operator interfaces that allow plant personnel to view telemetry and status data associated with the automation system, and to control some aspects of system operation. These operator interfaces typically execute on computers that are networked to one or more industrial controllers used to control the automation system, and render selected subsets of data read from the controllers in animated graphical or text formats on pre-developed display screens. Operator interfaces can be used to monitor such information as production statistics, real-time telemetry data (e.g., temperatures, pressures, flow rates, motor speeds, etc.), machine modes and statuses, alarm conditions, or other such metrics of the automation system being monitored.

Since industrial operator interfaces require access to data within the industrial controllers, and therefore must share a common network with the industrial controllers, such operator interface systems are conventionally located in proximity to the automation system being monitored. Consequently, industrial data and statuses can only be viewed by personnel in proximity to the automation system (e.g., on the plant floor). Moreover, the data available to such operator interfaces is limited to data stored in controllers sharing a common network with the operator interface terminal.

The above-described deficiencies of today's industrial control systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

One or more embodiments of the present disclosure relate to a cloud-based operator interface system that allows an industrial system to be monitored and/or controlled remotely via a cloud platform. To this end, an operator interface system running as a service on a cloud platform can receive industrial data from one or more industrial automation systems, and render the industrial data on selected Internet-capable devices via customized operator interface screens served to the devices from the cloud platform. The industrial data can be provided to the cloud-based operator interface system using one or more cloud gateways located at the respective industrial systems. The cloud gateways can gather data from the industrial controllers associated with a given industrial system and push the data to a customer-specific operator interface system residing on the cloud platform. In this manner, the cloud-based operator interface system can collect data from multiple industrial systems at different geographic locations, and store, filter, associate, correlate, and/or aggregate the collected data in meaningful ways according to the needs of the user. The operator interface system can generate displays screens for rendering selected subsets of the collected data, and deliver the displays to Internet-capable display devices via the Internet. Thus, the cloud-based operator interface system can allow authorized users to remotely monitor multiple industrial automation systems through any suitable computing device having access to the Internet (e.g., phone, desktop computer, laptop computer, tablet computer, etc.).

One or more embodiments of the cloud-based operator interface system can also support event-based notification of critical system events. In such embodiments, the cloud-based operator interface system can be configured to recognize critical events relating to one or more monitored industrial systems (e.g., a system parameter exceeding a setpoint value, a particular machine status, a machine or system alarm condition, etc.), and each defined event can be associated with a list of relevant personnel to be notified in response to occurrence of the defined event. When the operator interface system determines that a notification event has occurred (e.g., an event at one of the monitored industrial systems or an aggregate status based on aggregated data from multiple industrial systems), the operator interface system can deliver notifications of the event to devices associated with the relevant personnel.

The cloud-based operator interface system can also contextualize industrial data received from the various industrial systems to enhance the value of the information presented to the user. This can include tagging the data with contextual metadata, such as a time, a location, a production area, a machine or process state, personnel identifications, or other information that provides additional context for the data.

This appended contextual data can be leveraged in connection with aggregating, filtering, or summarizing the data on the cloud platform to facilitate flexible and meaningful presentation of the data to the client devices.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
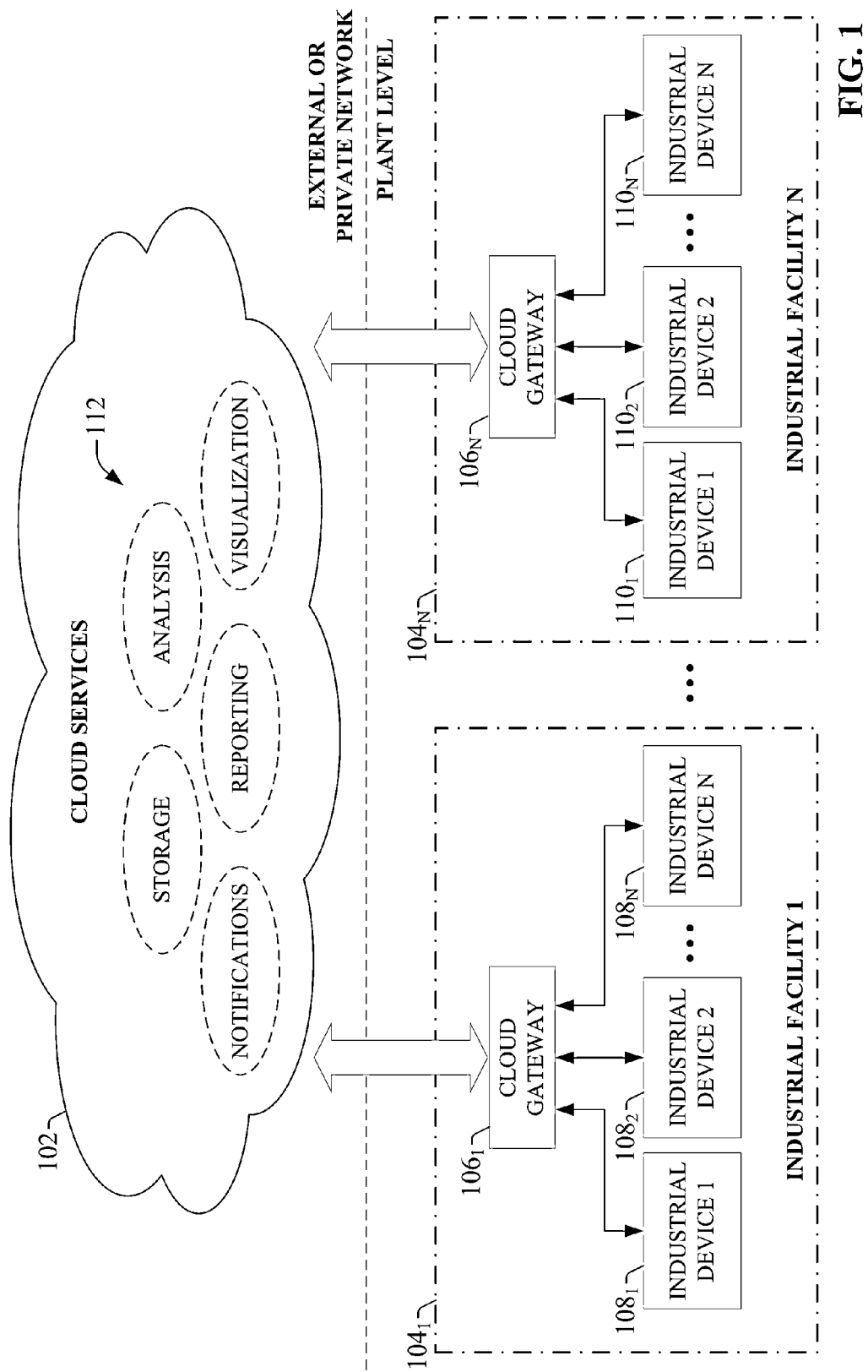
FIG. 1 is a high-level overview of an industrial enterprise that leverages cloud-based services.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removably affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 illustrates a high-level overview of an industrial enterprise that leverages cloud-based services. The enterprise comprises one or more industrial facilities 104, each having a number of industrial devices 108 and 110 in use. The industrial devices 108 and 110 can make up one or more automation systems operating within the respective facilities 104. Exemplary automation systems can include, but are not limited to, batch control systems (e.g., mixing systems), continuous control systems (e.g., PID control systems), or discrete control systems. Industrial devices 108 and 110 can include such devices as industrial controllers (e.g., programmable logic controllers or other types of programmable automation controllers); field devices such as sensors and meters; motor drives; operator interfaces (e.g., human-machine interfaces, industrial monitors, graphic terminals, message displays, etc.); industrial robots, barcode markers and readers; vision system devices (e.g., vision cameras); smart welders; or other such industrial devices.

Exemplary automation systems can include one or more industrial controllers that facilitate monitoring and control of their respective processes. The controllers exchange data with the field devices using native hardwired I/O or via a plant network such as Ethernet/IP, Data Highway Plus, ControlNet, Devicenet, or the like. A given controller typically receives any combination of digital or analog signals from the field devices indicating a current state of the devices and their associated processes (e.g., temperature, position, part presence or absence, fluid level, etc.), and executes a user-defined control program that performs automated decision-making for the controlled processes based on the received signals. The controller then outputs appropriate digital and/or analog control signaling to the field devices in accordance with the decisions made by the control program. These outputs can include device actuation signals, temperature or position control signals, operational commands to a machining or material handling robot, mixer control signals, motion control signals, and the like. The control program can comprise any suitable type of code used to process input signals read into the controller and to control output signals generated by the controller, including but not limited to ladder logic, sequential function charts, function block diagrams, structured text, or other such platforms.

Although the exemplary overview illustrated in FIG. 1 depicts the industrial devices 108 and 110 as residing in fixed-location industrial facilities 104, the industrial devices 108 and 110 may also be part of a mobile control application, such as a system contained in a truck or other service vehicle.

According to one or more embodiments of this disclosure, industrial devices 108 and 110 can be coupled to a cloud platform 102 in order to leverage cloud-based applications. That is, the industrial device 108 and 110 can be configured to discover and interact with cloud-based computing services 112 hosted by cloud platform 102. Cloud platform 102 can be any infrastructure that allows computing services 112 to be accessed and utilized by cloud-capable devices. Cloud platform 102 can be a public cloud accessible via the Internet by devices having Internet connectivity and appropriate authorizations to utilize the services 112. In some scenarios, cloud platform 102 can be provided by a cloud provider as a platform-as-a-service (PaaS), and the services 112 (such as the operator interface system described herein) can reside and execute on the cloud platform 102 as a cloud-based service. In some such configurations, access to the cloud platform 102 and the services 112 can be provided to customers as a subscription service by an owner of the services 112. Alternatively, cloud 102 can be a private cloud operated internally by the enterprise. An exemplary private cloud can comprise a set of servers hosting the cloud services 112 and residing on a corporate network protected by a firewall.

Cloud services 112 can include, but are not limited to, data storage, data analysis, control applications (e.g., applications that can generate and deliver control instructions to industrial devices 108 and 110 based on analysis of near real-time system data or other factors), visualization applications such as the cloud-based operator interface system described herein, reporting applications, Enterprise Resource Planning (ERP) applications, notification services, or other such applications. If cloud platform 102 is a web-based cloud, industrial devices 108 and 110 at the respective industrial facilities 104 may interact with cloud services 112 directly or via the Internet. In an exemplary configuration, industrial devices 108 and 110 may access the cloud services 112 through separate cloud gateways 106 at the respective industrial facilities 104, where the industrial devices 108 and 110 connect to the cloud gateways 106 through a physical or wireless local area network or radio link. In another exemplary configuration, the industrial devices may access the cloud platform directly using an integrated cloud interface.

Providing industrial devices with cloud capability can offer a number of advantages particular to industrial automation. For one, cloud-based storage offered by the cloud platform can be easily scaled to accommodate the large quantities of data generated daily by an industrial enterprise. Moreover, multiple industrial facilities at different geographical locations can migrate their respective automation data to the cloud for aggregation, collation, collective analysis, and enterprise-level reporting without the need to establish a private network between the facilities. Industrial devices 108 and 110 having smart configuration capability can be configured to automatically detect and communicate with the cloud platform 102 upon installation at any facility, simplifying integration with existing cloud-based data storage, analysis, or reporting applications used by the enterprise. In another exemplary application, cloud-based diagnostic applications can monitor the health of respective automation systems or their associated industrial devices across an entire plant, or across multiple industrial facilities that make up an enterprise. Cloud-based lot control applications can be used to track a unit of product through its stages of production and collect production data for each unit as it passes through each stage (e.g., barcode identifier, production statistics for each stage of production, quality test data, abnormal flags, etc.). These industrial cloud-computing applications are only intended to be exemplary, and the systems and methods described herein are not limited to these particular applications. The cloud platform 102 can allow builders of industrial applications to provide scalable solutions as a service, removing the burden of maintenance, upgrading, and backup of the underlying infrastructure and framework.

Figure 2:
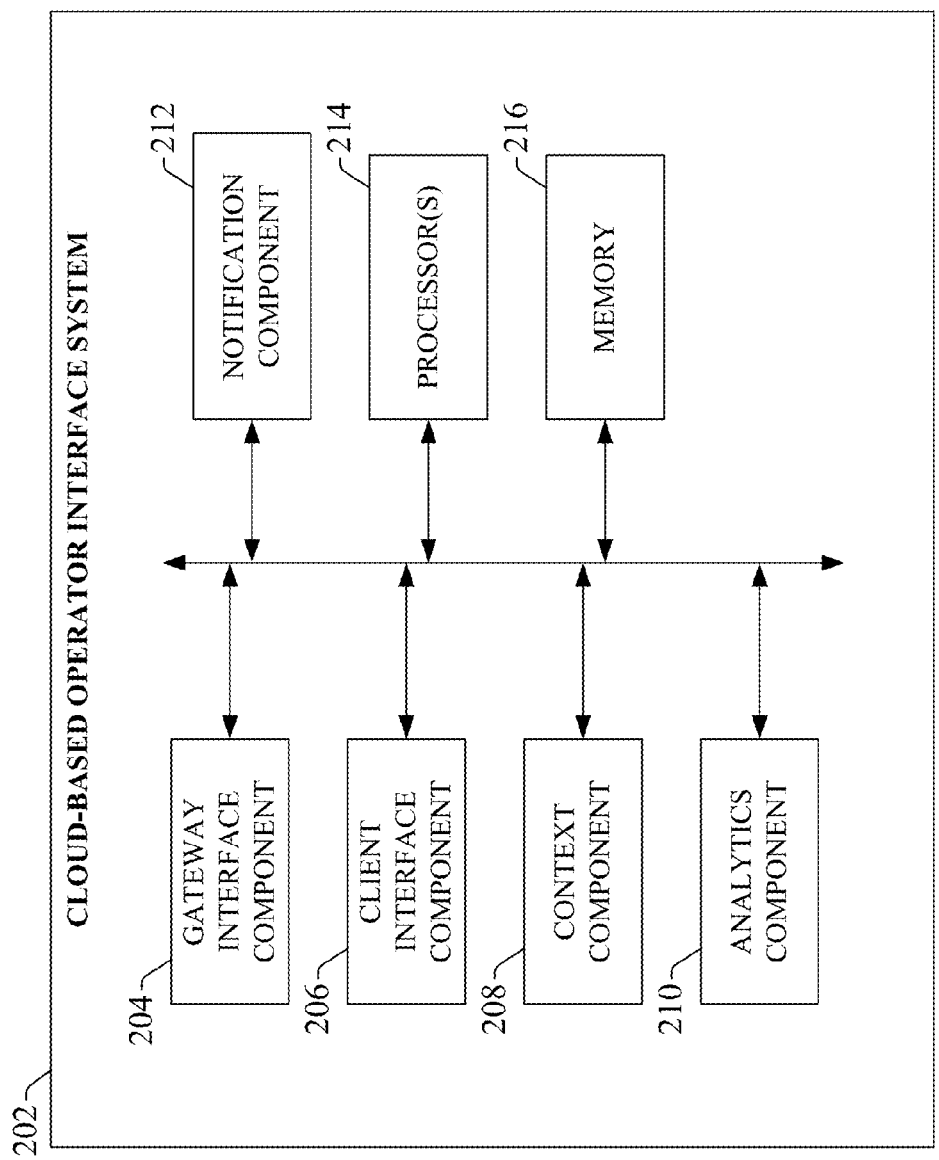
FIG. 2 is a block diagram of an exemplary cloud-based operator interface system that collects and provisions industrial data via a cloud platform.

FIG. 2 is a block diagram of an exemplary cloud-based operator interface system that can be used to collect and provision industrial data via a cloud platform. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Cloud-based operator interface system 202 can include a gateway interface component 204, a client interface component 206, a context component 208, an analytics component 210, a notification component 212, one or more processors 214, and memory 216. In various embodiments, one or more of the gateway interface component 204, client interface component 206, context component 208, analytics component 210, notification component 212, one or more processors 214, and memory 216 can be electrically and/or communicatively coupled to one another to perform one or more of the functions of the cloud-based operator interface system 202. In some embodiments, components 204, 206, 208, 210, and 212 can comprise software instructions stored on memory 216 and executed by processor(s) 214. The cloud-based operator interface system 202 may also interact with other hardware and/or software components not depicted in FIG. 2. For example, processor(s) 214 may interact with one or more external user interface devices, such as a keyboard, a mouse, a display monitor, a touchscreen, or other such interface devices.

Gateway interface component 204 can be configured to receive industrial data sent by one or more cloud gateways at respective industrial systems. Client interface component 206 can be configured to deliver pre-configured display screens to remote devices having Internet connectivity, and to render selected subsets of the collected industrial data via the display screens. Context component 208 can be configured to append contextual information to data received by the gateway interface component 204. This contextual information can include, but is not limited to, a time/date stamp, a location associated with the data (e.g., a geographical location, a production area, etc.), machine statuses at the time the data was generated, a lot number, or other such contextual information.

Analytics component 210 can be configured to analyze the received industrial data according to predefined criteria. For example, the analytics component 210 can analyzed incoming industrial data substantially in real-time to determine whether a predefined event relating to an industrial system (or an aggregation of disparate industrial systems) has been met, for the purpose of generating and delivering alarm indications or notifications to selected devices. Notification component 212 can be configured to deliver such notifications to the selected devices according to predefined user preferences. The one or more processors 214 can perform one or more of the functions described herein with reference to the systems and/or methods disclosed. Memory 216 can be a computer-readable storage medium storing computer-executable instructions and/or information for performing the functions described herein with reference to the systems and/or methods disclosed. In some embodiments, memory 216 can be cloud-based storage provided by the cloud platform that maintains and executes the cloud-based operator interface system 202.

Figure 3:
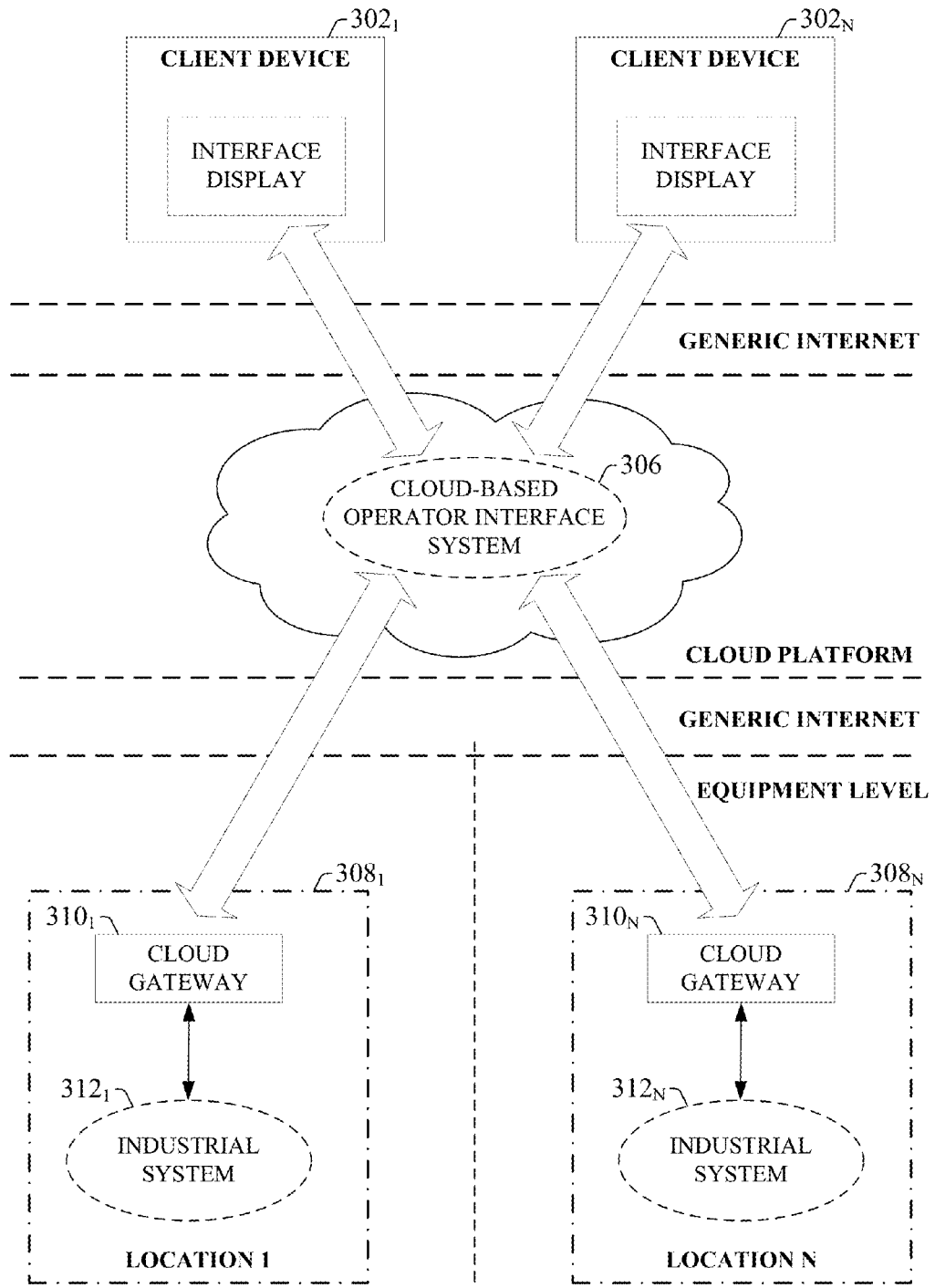
FIG. 3 is a high-level overview of a cloud-based operator interface system that collects and aggregates data from multiple industrial systems and visualizes the data on Internet-capable client devices.

FIG. 3 illustrates a high-level overview of a cloud-based operator interface system that collects and aggregates data from multiple industrial systems and visualizes the data on Internet-capable client devices. Embodiments of the cloud-based operator interface system described herein can interact with suitable client devices to implement substantially any type of industrial operator interface system, including but not limited to human-machine interfaces (HMIs), graphic terminal systems, industrial monitors, message display systems, or other such operator interface applications. Accordingly, the term "operator interface" as used throughout this disclosure is to be understood to encompass all such industrial display systems.

Cloud-based operator interface system 306 resides on a cloud platform (similar to cloud platform 102 of FIG. 1). Industrial systems $312_1$-$312_N$ use respective cloud gateways $310_1$-$310_N$ to push industrial data relating to the industrial systems $312_1$-$312_N$ to the cloud platform for collection and processing at the cloud-based operator interface system 306. Industrial systems $312_1$-$312_N$ may be, for example, automation systems located at respective manufacturing or processing facilities $308_1$-$308_N$. One or more of the industrial systems $312_1$-$312_N$ may also be mobile systems (e.g., systems embedded in service or cargo vehicles) that are to be monitored and/or controlled regardless of their location. In some exemplary scenarios, the industrial systems $312_1$-$312_N$ will belong to a common industrial enterprise or business, and the cloud-based operator interface system 306 can be made available to the enterprise as a subscription service. In other exemplary scenarios, cloud-based operator interface system 306 may provide remote operator interface and visualization services to multiple customers. In such cases, industrial systems $312_1$-$312_N$ may belong to multiple different equipment owners or businesses.

In some embodiments, the cloud gateways $310_1$-$310_N$ can gather the data from one or more industrial controllers that monitor and control portions of the industrial systems $312_1$-$312_N$, and push the controller data to the cloud platform via web services exposed by a cloud application. Also, in some applications, the cloud gateways $310_1$-$310_N$, the industrial controllers, or other industrial devices comprising the industrial systems $312_1$-$312_N$ may transform the raw industrial data prior to upload to a format better suited to cloud-based storage, computing, or analysis. For example, the cloud gateways $310_1$-$310_N$ may filter, prune, re-format, aggregate, summarize, or compress the raw industrial data to more efficiently utilize cloud bandwidth and/or storage resources. Alternatively, the cloud gateways $310_1$-$310_N$ may upload the raw industrial data to the cloud platform without applying additional transformations to the data.

The cloud-based operator interface system 306 receives the industrial data from the multiple industrial systems $312_1$-$312_N$ and makes the data available to client devices $302_1$-$302_N$ associated with users having appropriate access privileges to the data. If the industrial data is to be stored for historian or reporting purposes, the cloud-based operator interface system 306 can store the data on cloud-based storage associated with the cloud platform. The client devices $302_1$-$302_N$ access the cloud-based operator interface system 306 through a generic Internet level. To facilitate viewing of the industrial data, cloud-based operator interface system 306 can serve display screens to the client devices $302_1$-$302_N$ that can be viewed using the devices' native display capabilities. The display screens can be preconfigured by an administrator of the cloud-based operator interface system 306, although some embodiments can allow the owners of the client devices $302_1$-$302_N$ to customize the way the industrial data is presented on the respective devices. Client devices $302_1$-$302_N$ can be personal device such as mobile phones having graphical display capabilities, desktop or laptop computers, tablet computers, or other such devices. Client devices $302_1$-$302_N$ may also be industrial display devices such as HMI display terminals, graphic terminals, industrial monitors, message displays, television monitors, or the like.

In one or more embodiments, the cloud-based operator interface system 306 can apply cloud-side processing to the industrial data to facilitate presenting the data in meaningful ways to the client devices $302_1$-$302_N$. For example, cloud-based operator interface system 306 can add context to the incoming data (e.g., a time/date stamp, a location associated with the data, machine statuses at the time the data was generated, etc.). The cloud-based operator interface system 306 may also aggregate data from multiple industrial systems $312_1$-$312_N$ according to predefined aggregation rules defined by the user. Using these tools in the context of a cloud-based operator interface system, data from multiple, geographically diverse industrial systems can be collected, correlated, and aggregated to generate unified enterprise-level presentations of the industrial systems as a whole.

Figure 4:
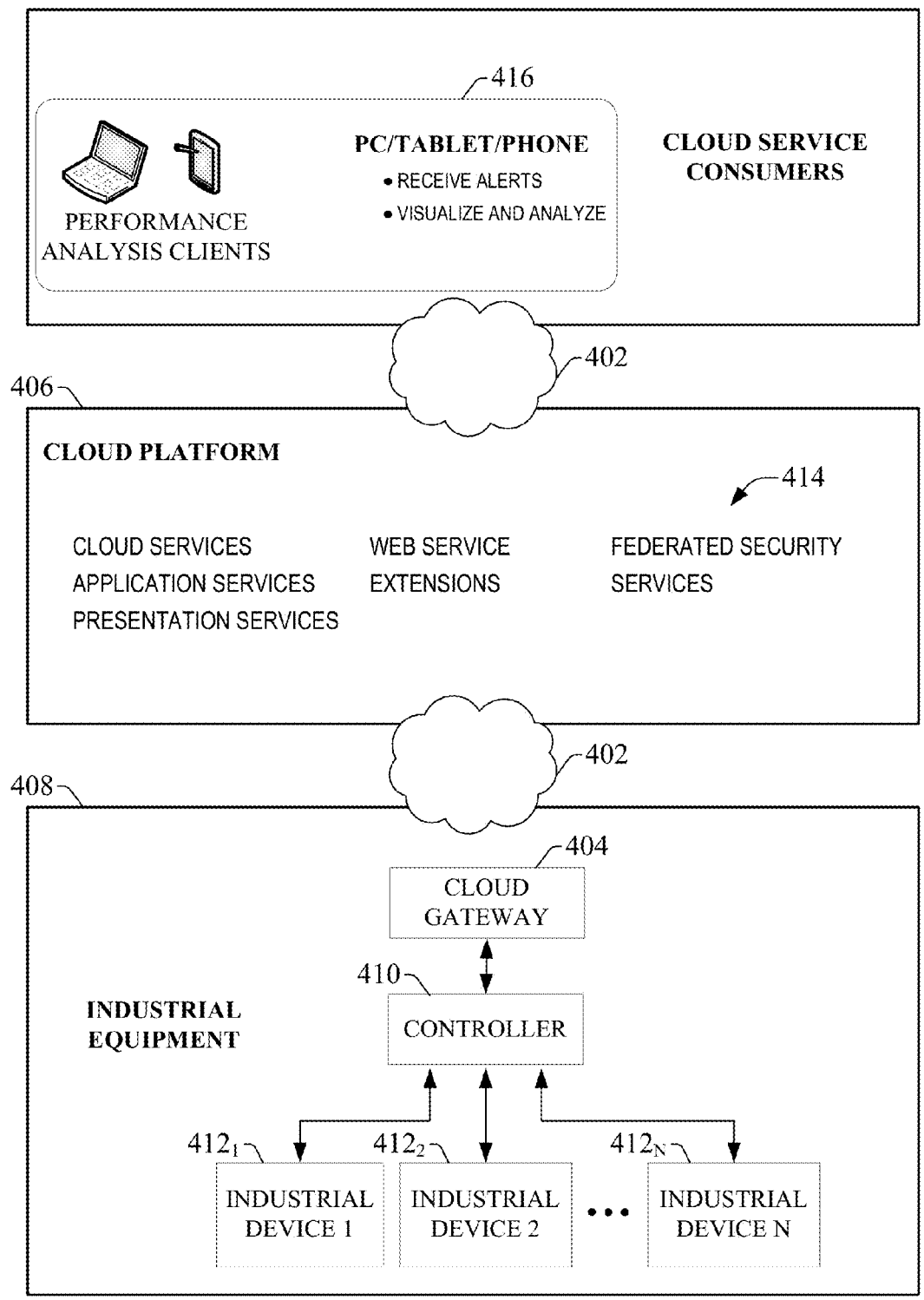
FIG. 4 illustrates a high level architecture of a cloud gateway application that uploads data from a controller to an associated cloud application.

FIG. 4 illustrates a high level architecture of a cloud gateway application that can be used to upload data from a controller to a cloud application, such as a cloud-based operator interface system. The major layers are the generic Internet 402, the cloud platform 406, and the industrial equipment 408 comprising an industrial system. Industrial equipment 408 can be, for example, an industrial system comprising a number of industrial devices $412_1$-$412_N$ being monitored and/or controlled by an industrial controller 410. Industrial equipment 408 can also comprise higher level systems, such as on-premise data historians (including site-level historians or machine-level historians), supervisory control systems, batch systems, business intelligence systems, or other business-level or enterprise-level systems. Industrial equipment 408 can have a fixed location (e.g., an industrial facility), or can be a mobile system (e.g., a controlled system loaded on a service or cargo vehicle). A cloud gateway 404 can be used to periodically or continuously upload data from the controller 410 to one or more cloud applications on cloud platform 406, such as a cloud-based operator interface system, cloud-based storage, cloud-side processing services, or other cloud-based services. Cloud gateway 404 can access cloud platform 406, for example, via a generic internet layer 402.

In an exemplary scenario, cloud platform 406 can comprise a set of cloud resources provisioned to a provider of cloud services 414 as a platform-as-a-service (Paas), and the cloud services 414 (such as the operator interface system described herein) can reside and execute on the cloud platform 406 as cloud-based services.

Cloud applications such as the cloud-based operator interface system and associated cloud services described herein can be built on the cloud platform 406. In one or more embodiments, the cloud platform 406 can be compatible with data models that are developed for enhanced manufacturing intelligence (EMI) software. Such applications can collect data from a customer's industrial system and correlate the data for the purpose of generating reports, creating custom visualizations, archiving the data, performing system analyses, or other functions. The cloud services 414 can support federated security, which provides secured access to the cloud services from smart devices, such as phones and tablet computers.

The cloud services 414 can deliver visibility, reporting, analytics, and event management via clients 416, which can interface with the cloud services 414 via the generic Internet layer 402. To cater for smart devices such as smart phones and tablet PCs, some cloud services 414 may not leverage flash-based dashboards, which often cannot be rendered on some mobile devices. Instead, some cloud services 414 may include dashboards built based on HyperText Markup Language (HTML) and/or JavaScript technology. Internally, such dashboards may use a set of JSON (JavaScript Object Notation) based web services that are optimized for consumption by HTML/Javascript components. The foregoing should be understood as a concrete example and does not exclude the use of other appropriate technologies for communicating data to the client and displaying data on client devices.

The cloud gateway 404 can be any suitable device capable of gathering data from controller 410 or other industrial equipment, and pushing the data to the cloud applications on cloud platform 406. The cloud gateway 404 can be a stand-alone device, such as a computer running cloud gateway services and sharing a network with the controller 410. Alternatively, the cloud gateway 404 can be embedded in the controller 410 or other piece of industrial equipment. In some embodiments, the cloud gateway 404 may also be integrated within a network interface device, such as a hub, switch, router, or firewall box, residing on a common network with controller 410. The cloud gateway 404 can include a service responsible for pushing controller data from the controller 410 into cloud-based storage on cloud platform 406 via web services exposed by one or more cloud applications (e.g., the cloud-based operator interface system). One or more embodiments of the cloud gateway 404 can support store-and-forward logic that causes controller data to be uploaded to the cloud platform 406 to be temporarily stored locally on the gateway 404 in the event that the connection between the gateway 404 and the cloud platform 406 is disrupted. Any suitable communication technology can be used to facilitate communication between the cloud gateway 404 and the cloud platform 406, including but not limited to wireless radio (e.g., 3 G, 4 G, etc.).

In addition to sending controller data to cloud-based applications on cloud platform 406, the cloud gateway 404 can also receive configuration instructions from the cloud-based applications. For example, a cloud-based application (such as the cloud-based operator interface system described herein) can send an instruction informing the gateway 404 how frequently data should be uploaded to the cloud-based application (e.g., every minute, every 15 minutes, etc.). The cloud gateway 404 can also be configured locally using a stored configuration data that holds such information as a system identifier (e.g., identification of the industrial system monitored by the cloud gateway 404), a controller identifier of controller 410, a list of controller tags whose values are to be ready by the gateway 404 and uploaded to the cloud-based application, a uniform resource locator (URL) of the cloud-based application, a maximum amount of data to store locally at the cloud gateway 404 in the event of communication loss between the gateway 404 and the cloud platform 406, or other such configuration information.

Figure 5:
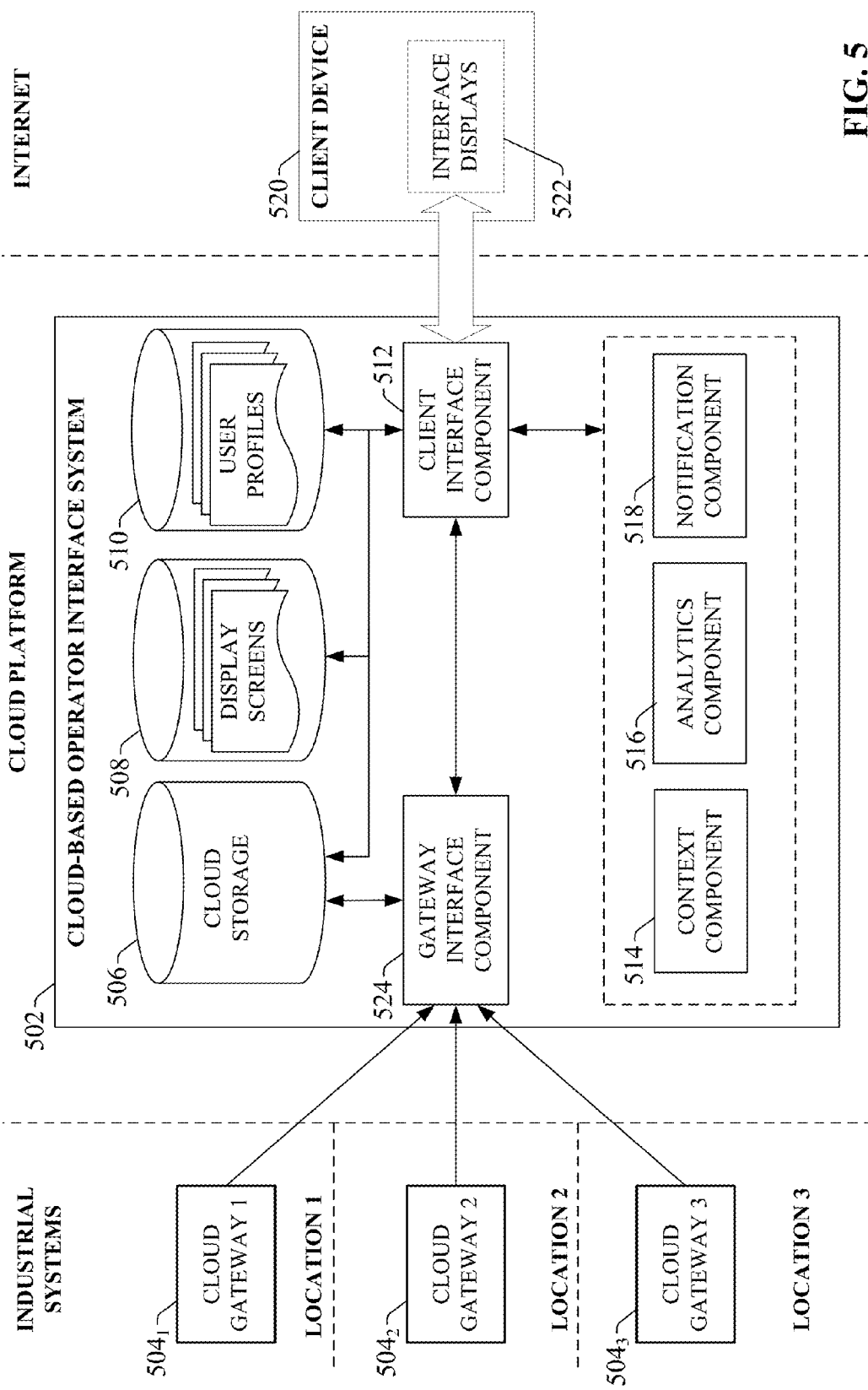
FIG. 5 is a block diagram illustrating components of an exemplary cloud-based operator interface system.

FIG. 5 is a block diagram illustrating components of an exemplary cloud-based operator interface system. As described in previous examples, cloud-based operator interface system 502 can reside on a cloud platform and receive industrial data from respective cloud gateways 504 (similar to cloud gateways 310 and 404 of FIGS. 3 and 4, respectively). In one or more embodiments, the cloud-based operator interface system 502 can reside and execute on the cloud platform as a cloud-based service, and access to the cloud platform and operator interface system 502 can be provided to customers (e.g., owners of the industrial systems to be monitored and controlled via the cloud based operator interface system 502) as a subscription service by a provider of the services associated with the cloud-based operator interface system 502.

The cloud gateways 504 can retrieve data from respective fixed or mobile industrial systems (e.g., from one or more industrial controllers that monitor and control the respective industrial systems) and send the retrieved data to the cloud-based operator interface system 502. The cloud gateways 504 can reside at different locations (e.g., locations 1-3 of FIG. 5). For example, some cloud gateways 504 can be associated with respective automation systems at geographically diverse industrial facilities, or at different areas within the same facility which may or may not reside on a common local area network. Some cloud gateways 504 may also be embedded within mobile systems, such as service vehicles or cargo trucks having built-in control systems or tracking systems.

The cloud gateways 504 can send their respective industrial data to the cloud-based operator interface system 502 at a frequency defined by the operator interface system 502. For example, an administrator of the cloud-based operator interface system 502 can define an upload frequency individually for the respective cloud gateways 504, and the gateway interface component 524 can provide corresponding configuration instructions to the respective cloud gateways 504 configuring the upload frequencies accordingly. Alternatively or in addition, the cloud-based operator interface system 502 may dynamically select a suitable upload frequency for the respective cloud gateways 504 during operation. For example, in order to control costs associated with cloud resource utilization, an administrator of the cloud-based operator interface system can, in one or more embodiments, configure a maximum total bandwidth usage for the cloud-based operator interface system 502, such that the total instantaneous bandwidth usage for data traffic between the cloud gateways 504 and the cloud-based operator interface system 502 is not to exceed the configured maximum bandwidth. In such embodiments, the cloud-based operator interface system 502 can monitor the total bandwidth utilization substantially in real-time, and dynamically reduce the upload frequency of one or more cloud gateways 504 in response to a determination that the total bandwidth usage is approaching the defined maximum bandwidth. In another example, an administrator can configure a limit on the total amount of cloud storage to be used for historical data collection. Accordingly, if the cloud-based operator interface system 502 determines that this storage limit is being approached, the operator interface system 502 can send an instruction to one or more cloud gateways 504 to reduce their upload frequencies, thereby slowing the consumption of cloud storage resources. The cloud-based operator interface system 502 can select which cloud gateways 504 are to be adjusted based on respective criticalities of the control systems associated with the cloud gateways 504. For example, cloud-based operator interface system 502 can maintain individual gateway profiles (not shown) defining relative priorities of the industrial systems associated with each cloud gateway 504, and can leverage this information in connection with determining which cloud gateways 504 are to be selected for reduced upload frequency in the event that one or more cloud resources are being used at an excessive rate.

The industrial data from the cloud gateways 504 are received at gateway interface component 524, which can store the received data on cloud storage 506 (if the data is to be archived for later viewing), or pass the data directly to client interface component 512 for delivery to an Internet capable client device 520 to facilitate substantially (near) real-time monitoring of the industrial data. Cloud storage 506 can comprise a subset of the cloud platform's storage resources provisioned to an owner of the industrial systems (e.g., an industrial enterprise) for the purpose of storing the received industrial data. For example, cloud storage 506 can be provided to an industrial enterprise as part of a subscription service that includes access to the cloud-based operator interface system 502 and its associated cloud services.

Client interface component 512 can serve predesigned interface displays 522 to any Internet-capable client device 520 (similar to client devices 302 and 416 of FIGS. 3 and 4, respectively) having access privileges to the cloud-based operator interface system 502, and render selected subsets of the industrial data via the display screens using the client device's native display capabilities. To this end, a set of preconfigured display screens 508 can be stored on cloud storage associated with the operator interface system 502, and the client interface component 512 can deliver selected display screens 508 in response to invocation by the client device 520. The display screens 508 can be developed, for example, using a development environment provided by the cloud-based operator interface system 502. In one or more embodiments, the cloud-based operator interface system 502 can provide this development environment as a cloud service, allowing a developer to remotely access a set of cloud-side interface screen development tools to facilitate design of interface screen layouts, data links, graphical animations, and navigation links between screens. In such embodiments, the interface screen development environment can allow the developer to leverage cloud resources (e.g., cloud storage and processing resources) to develop a set of display screens 508 for a given operator interface application to be run on the operator interface system 502. Alternatively, some embodiments of the cloud-based operator interface system 502 can allow display screens developed by external display development applications to be uploaded to the cloud platform and executed by the operator interface system 502 during runtime.

Each of the display screens 508 can include display tags defining which data items are to be displayed on the respective screens, formats for the respective data items, desired graphical animations to be associated with the respective data items, graphical elements to be included on the respective display screens (e.g., externally defined graphical elements definitions), and other such configuration information. Some display screens 508 can also be configured to render alarm or informational messages in response to determinations that subsets of the industrial data provided by cloud gateways 504 have met certain conditions (e.g., in response to a determination that a given industrial parameter has exceeded a defined setpoint, or that a defined production goal has been met). Since industrial data can be received from multiple industrial systems (possibly at diverse geographical locations), alarms, notification events, animation triggers, and the like can be defined in terms of composite industrial data values for multiple industrial systems, allowing the industrial systems to be viewed and analyzed from a high-level enterprise perspective. For example, consider a scenario in which a particular product is being produced at three different facilities (e.g., locations 1-3 of FIG. 5). The respective cloud gateways 504 can deliver production statistics to the gateway interface component 524, and the operator interface system 502 can aggregate these production statistics substantially in real-time to yield composite data (e.g., a total production count for all three facilities) even though the three facilities may not be communicatively networked together over a data network. One or more of the displays screens 508 can be configured to display these composite production statistics, trigger alarms or graphical animations as a function of the composite statistics, etc. Client interface component 512 can deliver these display screens to an authorized client device 520 having Internet access and suitable authorization credentials, providing an owner of the client device 502 with an enterprise-level view of the multiple industrial systems monitored by the operator interface system 502.

The cloud-based operator interface system 502 can support conditional display of industrial data based on defined user roles having different levels of access privileges. Accordingly, the operator interface system 502 can allow multiple user roles to be defined (e.g., operator, plant manager, finance, accounting, administrator, etc.), and customize the presentation of industrial data for the respective user roles. For example, an administrator can associate a given user role with a subset of display screens 508 that users belonging to that user role are allowed to access. In another example, selected data displays on the display screens 508 can be configured with visibility links that render the selected data visible only to users associated with certain authorized user roles.

In order to provide support for user-specific customization, cloud-based operator interface system 502 can maintain a set of user profiles 510 corresponding to respective users of the system. An exemplary user profile can include such information as a user identifier, one or more user roles to which the user belongs, and any user-defined preferences configured by the user. For example, some user roles may be given permission to customize certain presentation aspects of the display screens 508 from their client device (e.g., alter an arrangement of data items on the screen, customize colors, render selected data valves invisible, etc.). When a user having such permissions customizes such presentation aspects at the client device 520, the operator interface system 502 can save these preferences to the user's profile. When the user subsequently invokes the customized display screen, the client interface component 512 will access the user's profile and apply the previously defined customization settings to the display screen prior to serving the display screen to the client device 520.

In a related aspect, one or more embodiments of the cloud-based operator interface system 502 can allow individual users to subscribe to selected real-time data feeds from one or more industrial systems. For example, a maintenance engineer may be interested in monitoring a particular performance metric of a specific machine at a plant facility. The operator interface system 502 can allow the engineer to identify the machine and the performance metric (e.g., a temperature of a die cast oven) and add this data feed to one of the existing display screens 508 as a user preference. Alternatively, the operator interface system 502 can create a new custom screen in response to the subscription request. In either case, the subscription information can be stored in the engineer's user profile, and the client interface component 512 can render a live feed of the selected performance metric to the engineer's client device 520 upon request.

Since the operator interface displays can be served to diverse types of client devices (e.g., desktop computers, mobile phones, tablet computers, laptop computers, HMI terminals, television monitors, etc.), the cloud-based operator interface system 502 can render a given display screen in a format suitable for display on the device invoking the screen, and in a manner that makes efficient use of the device's resources. For example, if the operator interface system 505 receives a request for a display screen from a cellular phone, the client interface component 512 can deliver the requested display screen to the cellular phone in a format adapted to the display capabilities of the phone (e.g., at a display ratio and resolution suitable for display on the phone's screen).

One or more embodiments of the cloud-based operator interface system can also support delivery of multimedia presentations to client device 520. For example, in addition to presentation of production data retrieved from industrial controllers, users may wish to view a live video or audio-video feed of an industrial process. Accordingly, cloud gateways 504 can deliver live video or audio-video stream information (e.g., from a web camera) to the gateway interface component 524, and the client interface component 512 can deliver this video stream to client device 520 in response to a request from the client device 520. In such embodiments, the operator interface system 502 can be configured to overlay selected subsets of live industrial data (also received from the cloud gateways 504) on the video to yield a composite presentation of the system.

In addition to delivery of industrial data from the cloud gateways 504, one or more embodiments of the cloud-based operator interface system 502 can also support two-way data exchange, allowing users to send data or issue commands to industrial systems remotely from a client device 520 via the cloud platform. For example, an operator may interact with interface display 522 (rendered on client device 520 by the operator interface system 502) to enter a new setpoint value for a selected machine at a remote automation system (e.g., via a data field provided on the operator interface screen). The client device 520 can send the new setpoint value to the cloud-based operator interface system via client interface component 512. The gateway interface component 524 can deliver this new setpoint value to a controller associated with the selected machine via the appropriate cloud gateway 504. The cloud gateway 504 can write the new setpoint value to the appropriate controller data tag or register, thereby implementing the new setpoint. In a similar manner, the cloud-based operator interface system 502 can allow single-bit commands to be issued from the client device 520, such as start/stop commands issued via a graphical pushbutton rendered on the interface display 522.

In order to enhance the value of received industrial data and provide greater depth for analysis, one or more embodiments of the cloud-based operator interface system 502 can add context to the data received by the cloud gateways 504. To this end, context component 514 can append contextual metadata to selected subsets of the industrial data as it is received by the cloud gateways 504, thereby providing useful context information for the industrial data that can be leveraged by the operator interface system 502 in connection with cloud-side analysis to enhance the user's understanding of the monitored industrial systems.

Figure 6:
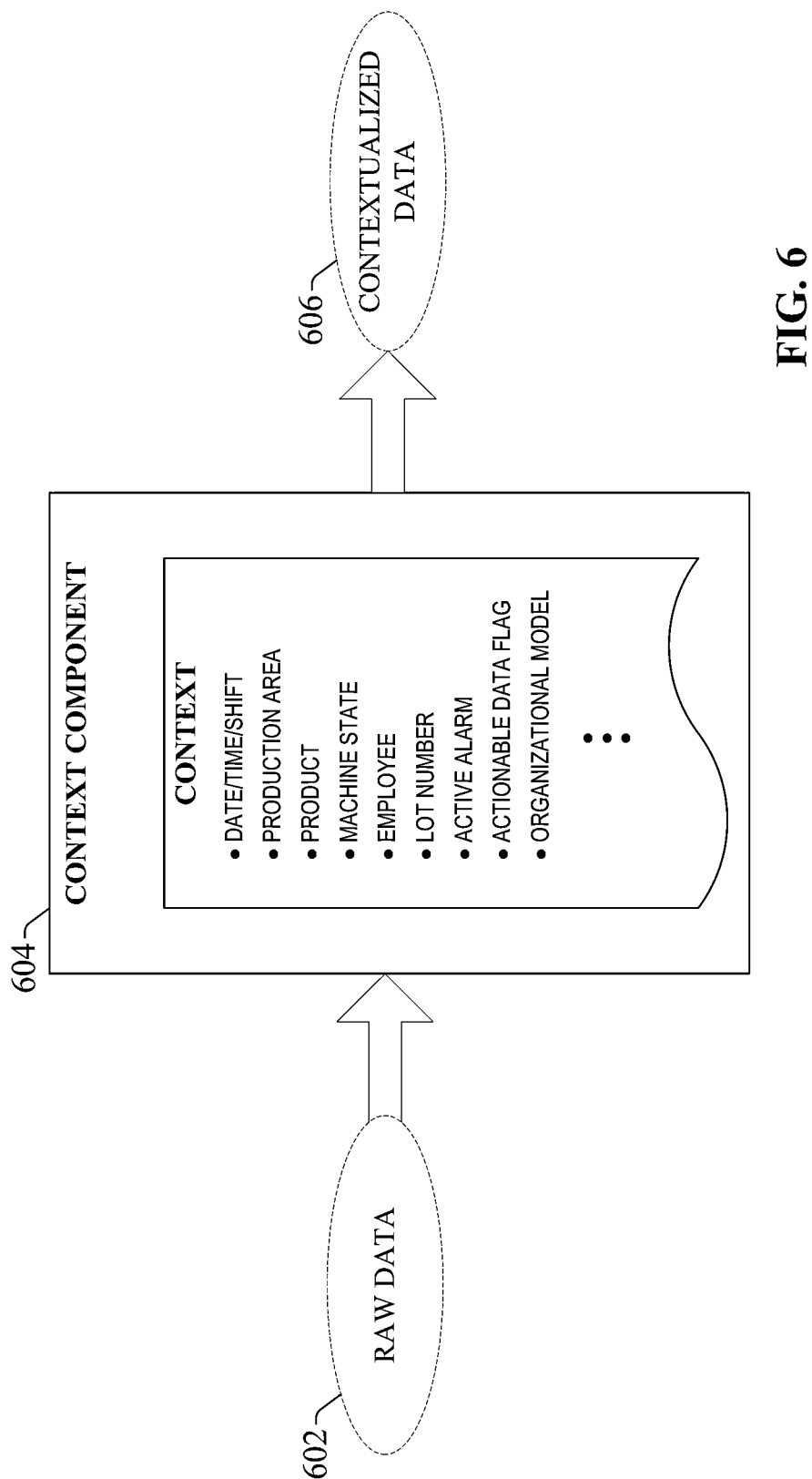
FIG. 6 illustrates an exemplary context component for transforming raw industrial data into contextualized data.

Turning briefly to FIG. 6, an exemplary context component for transforming raw industrial data into contextualized data is illustrated. Context component 604 (similar to context component 514 of FIG. 5) receives raw industrial data 602 (e.g., from cloud gateways 504 of FIG. 5), and enhances the raw data 602 with one or more pieces of context data to yield contextualized data 606. For example, context component 604 can apply a time stamp to the raw data 602 indicating a time, a date, and/or a production shift when the data was generated. The applied context data may also include a production area or plant facility that yielded the data, a particular product that was being produced when the data was generated, a state of a machine (e.g., auto, semi-auto, abnormal, etc.) at the time the data was generated, a geographical location of the data source (in the case of mobile control and/or monitoring systems, where such geographical location information can be received from a GPS device associated with the mobile system), etc. Other examples of context information include an employee on shift at the time the data was generated, a lot number with which the data is associated, or an alarm that was active at the time the data was generated. Context component 604 can also apply an actionable data tag to the raw data if it is determined that the data requires action to be taken by plant personnel or by another cloud-based application.

Context component 604 can also apply contextual information to the raw data 602 that reflects the data's location within a hierarchical organizational model. Such an organization model can represent an industrial enterprise in terms of multiple hierarchical levels. In an exemplary organizational model, the hierarchical levels can include—from lowest to highest—a workcell level, a line level, an area level, a site level, and an enterprise level. Devices that are components of a given automation system can be described and identified in terms of these hierarchical levels, allowing a common terminology to be used across the entire enterprise to identify devices, machines, and data within the enterprise. In some embodiments, the organizational model can be known to the context component 604, which can stamp the raw data 602 with a hierarchical identification tag that indicates the data's origin within the organizational hierarchy (e.g., Company:Marysville:DieCastArea:#1Headline:LeakTestCell).

Returning now to FIG. 5, some embodiments of the cloud-based operator interface system 502 can also include cloud-side analysis tools, which allow the received industrial data to be correlated and analyzed on the cloud platform. In particular, an analytics component 516 (similar to analytics component 210 of FIG. 2) can analyze subsets of the industrial data received from the cloud gateways 504 according to predefined user criteria. In an exemplary application, an administrator or other user with appropriate administrative rights can specify that production statistics from production lines at multiple geographically diverse facilities are to be aggregated, and a notification is to be sent to selected users when these aggregated production statistics exceed a defined setpoint (e.g., when a total production count of all production lines reaches a defined goal). Accordingly, analytics component 516 can aggregate the indicated production statistics substantially in real-time as the industrial data is received by the respective cloud gateways 504, and monitor these aggregated statistics to determine when the aggregate numbers meet the defined trigger event. When the analytics component 516 determines that the production goal has been met, it can instruct the client interface component 512 to deliver an indication (e.g., a message or graphical animation on a display screen, a text message, etc.) to one or more client devices associated with the relevant personnel.

Analytics component 516 can also be configured to analyze the incoming industrial data to identify short-term or long-term trends that may be of interest to users. For example, an administrator can configure the operator interface system 502 to store selected subsets of the industrial data (or aggregates thereof) in cloud storage 506, and configure the analytics component 516 to identify possible correlations between two sets of the stored data. In this regard, the analytics component 516 can leverage the contextual metadata added by the context component 514 to facilitate robust analysis of the industrial data. For example, the analytics component 516 may identify that a particular industrial machine runs less efficiently during certain work shifts or times of day, based on the received industrial data as well as date/time stamps or work shift identifiers applied to the data by the context component 514. The analytics component 516 can also monitor the industrial data to detect outliers or anomalies that may indicate either abnormal system operation or inaccurate data (e.g., a malfunctioning telemetry device or sensor), and instruct the client interface component 512 to deliver a suitable alert to the client device 520.

Figure 7:
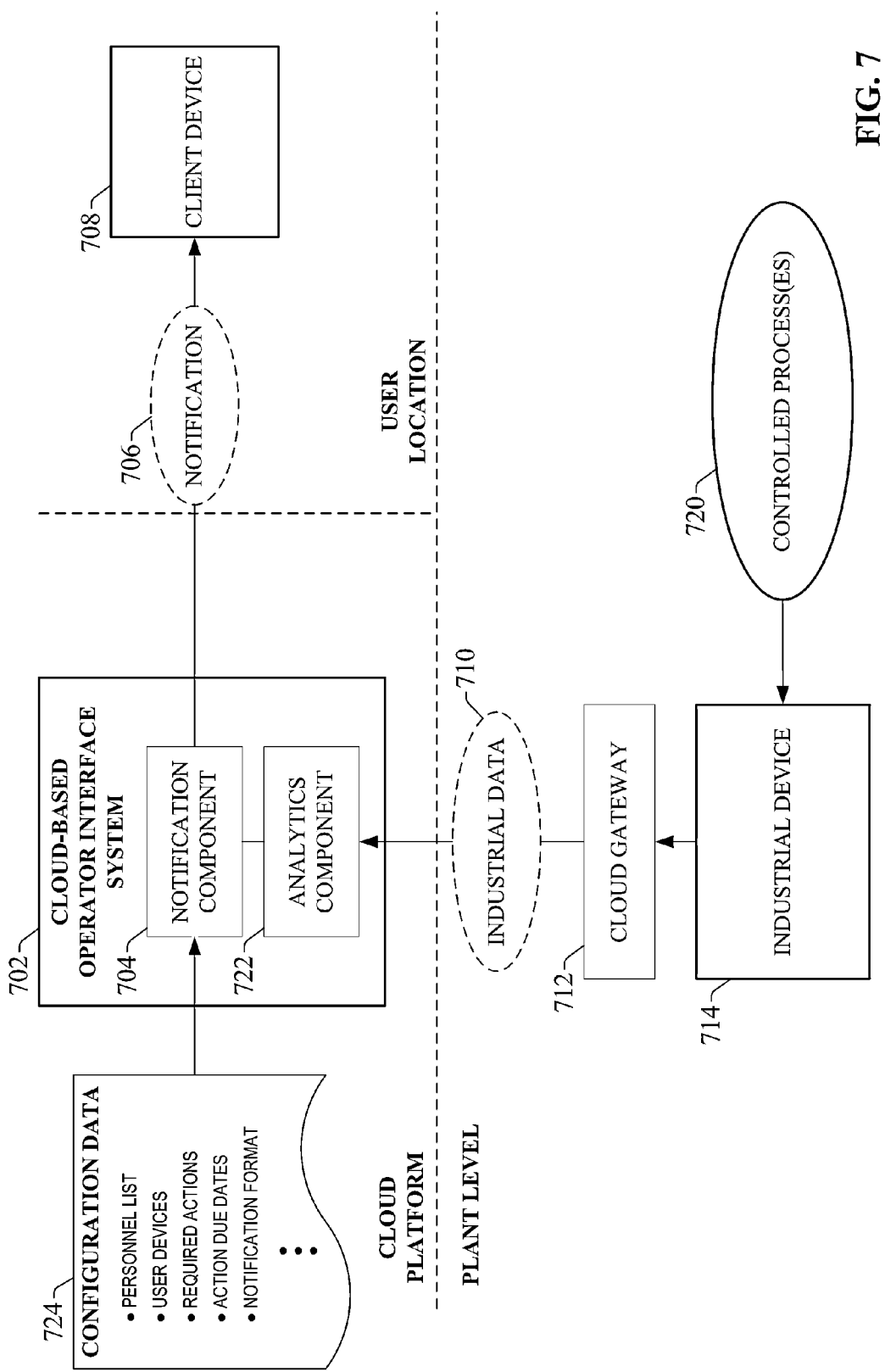
FIG. 7 is a block diagram of an exemplary cloud-based notification architecture.

As mentioned above, one or more embodiments of the cloud-based operator interface system 502 can include notification services for notifying relevant personnel of a detected event. Accordingly, the cloud-based operator interface system can include a notification component 518 (similar to notification component 212 of FIG. 2) configured to deliver such notifications to the selected client devices according to predefined user preferences. FIG. 7 illustrates an exemplary notification architecture according to one or more embodiments of this disclosure. In this example, one or more controlled processes 720 are monitored and/or controlled by industrial device 714, which can be an industrial controller, a sensor, a meter, a motor drive, or other such device. Alternatively, industrial device 714 may be a separate device (e.g., a proxy device) that is not directly involved in monitoring or controlling the controlled process(es) 720, but instead collects process data from industrial devices involved with controlling the controlled process(es) 720, and delivers this data to the cloud platform. In such embodiments, industrial device 714 can be, for example, a firewall box or other such network infrastructure device, a data collection server, or other suitable device capable of collecting or generating industrial data and providing this data to the cloud platform.

Industrial device 714 collects industrial data from controlled process(es) 720, or generates process data internally based on monitored conditions of the controlled process(es) 720. In the present example, the cloud-based operator interface system 702 running on the cloud platform can include notification component 704 (similar to notification component 518 of FIG. 5), which can be configured to receive industrial data 710 from a cloud gateway 712 associated with a customer's plant floor equipment and to route notifications 706 to appropriate plant personnel in accordance with predefined notification criteria.

On the cloud platform, analytics component 722 (similar to analytics component 516 of FIG. 5) can determine whether selected subsets of the industrial data 710 (or aggregations thereof) meet one or more predefined notification conditions. These can include such conditions as detecting that a particular process value has exceeded a defined setpoint, detecting a transition to a particular machine state, detecting an alarm condition, determining that a specified production goal has been achieved, or other such conditions that can be detected through analysis of the industrial data 710. When the analytics component 722 detects an actionable condition within the industrial data 710, analytics component 722 can inform the notification component 704 that personnel are to be notified. In response, the notification component 704 can identify one or more specific plant employees who are to receive the notification, as well as information identifying a user notification device, phone number, or email address for each person to be notified.

In one or more embodiments, the notification component 704 can determine this notification information by cross-referencing a configuration data 724 that identifies which personnel are to be notified for a given type of condition, one or more notification methods for each identified person, and/or other relevant information. When analytics component 722 determines that a subset of the industrial data 710 requires action to be taken by plant personnel, notification component 704 can reference configuration data 724 to determine, for example, which personnel should be notified, which user devices should receive the notification, a required action to be taken by the recipient, a due date for the action, a format for the notification, and/or other relevant information. Configuration data 724 can maintain multiple separate personnel lists respectively associated with different types of actionable situations. In some embodiments, the personnel list selected for a given notification can be at least partly a function of the context data appended by context component 514. For example, if industrial data 710 indicates that a process parameter has exceeded a setpoint value, the notification component 704 can identify the list of personnel to receive the notification based on the area or workcell to which the process parameter relates.

Once the notification component 704 had determined the appropriate personnel and devices to be notified, the notification component 704 can deliver notifications 706 to one or more notification destinations. The notification can be sent to one or more identified Internet-capable client devices 708, such as a phone, a tablet computer, a desktop computer, or other suitable devices. In some embodiments, a cloud application running on the cloud platform can provide a mechanism for notified personnel to communicate with one another via the cloud (e.g., establish a conference call using Voice-over-IP). In some embodiments, the notification component 704 can be configured to send the notification 706 periodically at a defined frequency until the user positively responds to the notification (e.g., by sending a manual acknowledgement via the client device 708). The notification component 704 can also be configured to escalate an urgency of high-priority notifications if an acknowledgment is not received within a predetermined amount of time. This urgency escalation can entail sending the notification 706 at a gradually increasing frequency, sending the notification to devices associated with secondary personnel if the primary personnel do not respond within a defined time period, or other such escalation measures.

Figure 8:
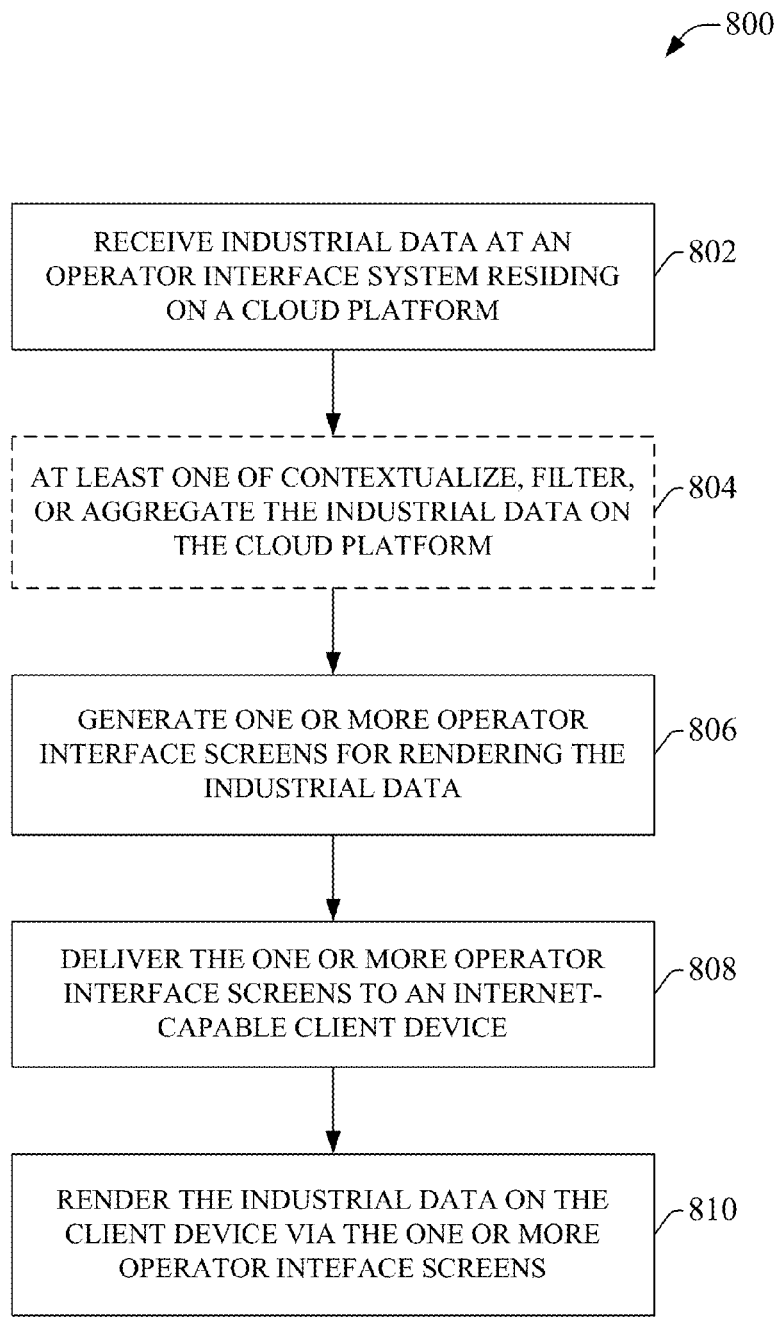
FIG. 8 is a flowchart of an example methodology for viewing and controlling one or more industrial systems through a cloud platform.
Figure 9:
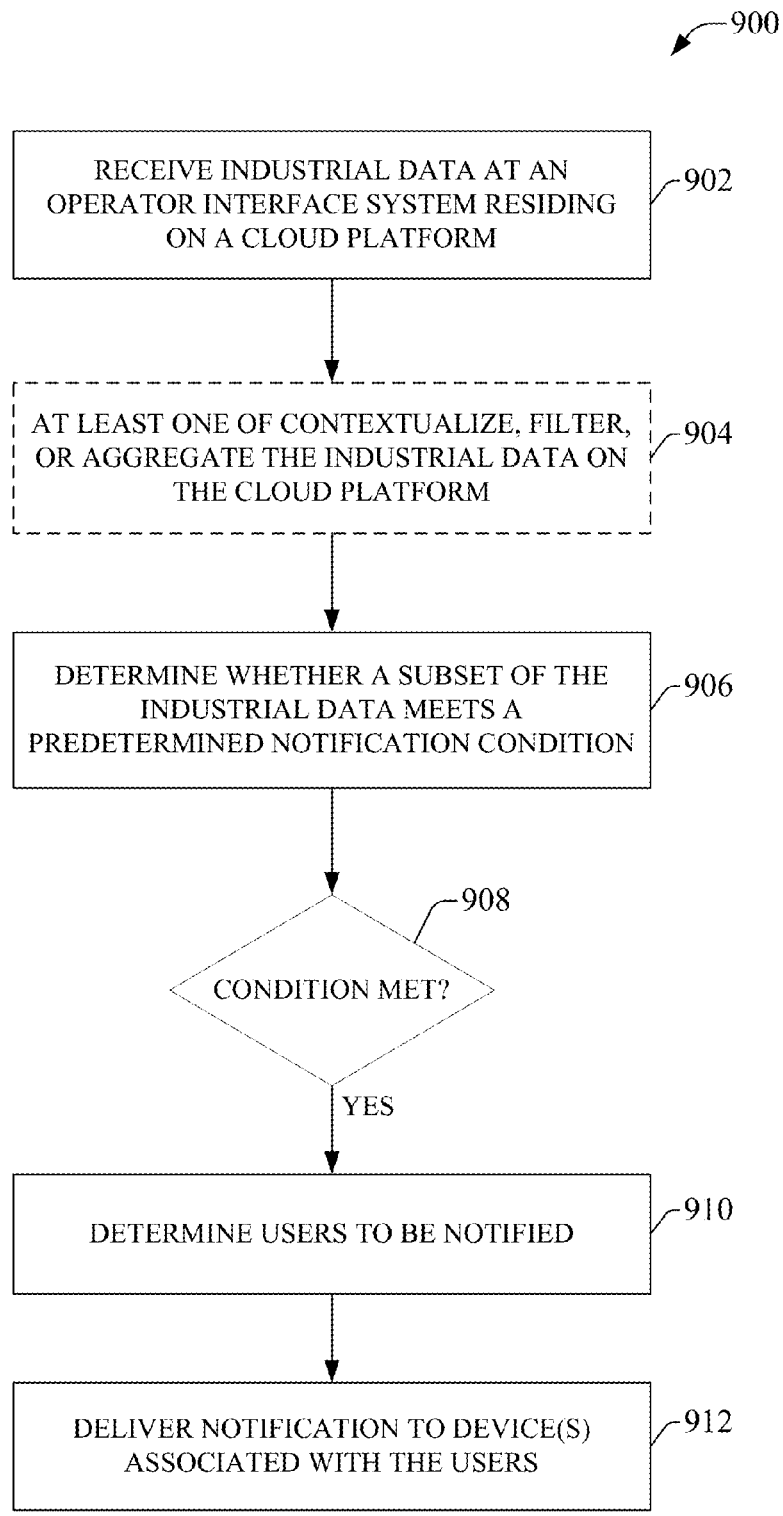
FIG. 9 is a flowchart of an example methodology for delivering notifications of industrial events through a cloud platform.
Figure 10:
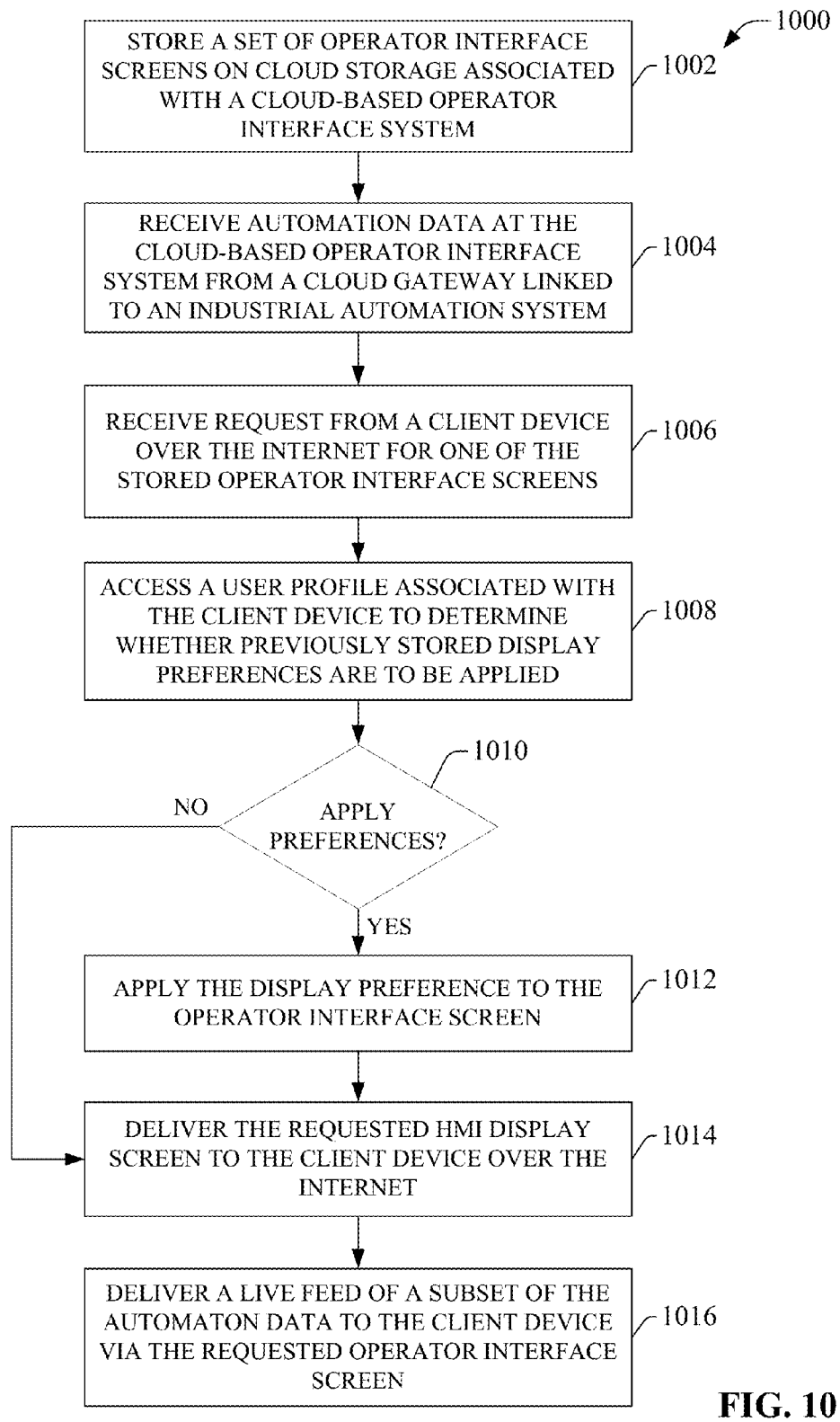
FIG. 10 is a flowchart of an example methodology for delivering operator interface display screens to Internet-capable client devices from a cloud platform.

FIGS. 8-10 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 8 illustrates an example methodology 800 for viewing and controlling one or more industrial systems through a cloud platform. Initially, at 802, industrial data is received at an operator interface system residing on a cloud platform. In one or more embodiments, the operator interface system can comprise a cloud service available to users (e.g., businesses, industrial enterprises, etc.) as a subscription service, and which utilizes cloud storage and processing resources to implement operator interface systems (e.g., HMIs, graphic terminals, message displays, industrial monitors etc.) capable of delivering an enterprise-level view of one or more industrial systems to Internet-capable client devices having suitable access privileges. The industrial data can be received at the operator interface system, for example from one or more cloud gateways (e.g., cloud gateways 310, 404, and 504 of FIGS. 3, 4, and 5, respectively).

Optionally, at 804, the industrial data can be at least one of contextualized, filtered, or aggregated on the cloud platform by the operator interface system. For example, the cloud-based operator interface can enhance some or all of the industrial data with contextual metadata that provides a context for the data, such as a time/date stamp; a geographic location, production area, or machine from which the data was received, a state of a process at the time the data was generated on the plant floor, identifications of plant personnel on duty at the time the data was generated, or other such contextual information. Related sets of data can also be aggregated (for example, production data from geographically diverse industrial facilities manufacturing a common product), or filtered to remove redundant data.

At 806, one or more operator interface screens are generated by the cloud-based operator interface system for rendering a selected subset of the industrial data. The operator interface screens can comprise pre-developed display screens stored on a subset of the cloud platform's storage resources, and which can be invoked by the remote client devices through the Internet. At 808, the one or more operator interface screens are delivered to an Internet-capable client device. In one or more embodiments, the cloud-based operator interface system can tailor the one or more operator interface screens to adapt to the particular display capabilities of the client device, based on a determination of a type of device being served (e.g., mobile phone with limited display capabilities, a desktop computer, a tablet computer, etc.). At 810, at least a subset of the industrial data is rendered on the client device via the one or more operator interface screens.

FIG. 9 illustrates an example methodology 900 for delivering notifications of industrial events through a cloud platform. Initially, at 902, industrial data is received at an operator interface system running as a service on a cloud platform (e.g., from cloud gateways 310, 404, or 504 of FIGS. 3, 4, and 5, respectively). Optionally, at 904, the industrial data can be at least one of contextualized, filtered, or aggregated on the cloud platform by the operator interface system, as described in previous examples. At 906, a determination can be made regarding whether a subset of the industrial data meets a predefined notification condition. The notification condition can comprise, for example, a determination that a particular process value has exceeded a defined setpoint, detection that a machine has transitioned to a particular machine state, detection of an alarm condition, a determination that a specified production goal has been achieved, or other such conditions that can be detected through analysis of the industrial data.

If it is determined at 908 that the notification condition has been met, the methodology moves to step 910, where a determination is made regarding which users of the operator interface system are to be notified. The operator interface system can make this determination, for example, by referencing configuration data that identifies which personnel are to be notified for a given type of system condition, one or more notification methods for each identified person, and/or other such information. At 912, a notification is delivered from the cloud platform to the devices associated with the users identified at step 910. The notification can be sent to any suitable Internet-capable client device, such as a phone, a tablet computer, a desktop computer, or other such devices. It is to be appreciated that steps 902-906 may continue to be performed while notification steps 910 and 912 are executing, as new industrial data is received at the operator interface system.

FIG. 10 illustrates an example methodology 1000 for delivering operator interface screens to Internet-capable client devices from a cloud platform. Initially, at 1002, a set of operator interface screens are stored on cloud storage associated with a cloud-based operator interface system. These display screens can be developed, for example, using a cloud-based display screen development service that allows a developer to leverage cloud resources in connection with developing the set of operator interface screens. Alternatively, the operator interface screens can be developed locally at a user workstation and uploaded to the cloud platform for storage by the cloud-based operator interface system.

At 1004, automation data generated by an industrial automation system is received at the cloud-based operator interface system. The data can be receive, for example, by a cloud gateway that reads the automation data from an industrial controller and pushes the data to the cloud platform for use by the cloud-based operator interface system. At 1006, a request for one of the stored operator interface screens is received from a client device over the Internet. In response to receiving the request, at 1008, a user profile associated with the client device is access to determine whether any previously stored display preferences are to be applied to the requested operator interface screen prior to delivery. For example, a user of the client device may have customized one or more aspects of the requested operator interface screen during a previous viewing. These customized aspects can be stored in the user profile associated with the client device so that the cloud-based operator interface system can apply the user's preferences the next time the screen is invoked by the client device. In this manner, a common set of operator interface screens can be stored on the cloud platform and served to multiple users in accordance with respective user display preferences.

If it is determined at 1010 that the user profile specifies a display preference, the display preference is applied to the operator interface screen at 1012. At 1014, the requested operator interface screen is delivered to the client device over the Internet. If it is determined at 1010 that no display preferences are to be applied, the methodology moves directly to step 1014 without applying a display preference at 1012. At 1016, a live feed of a subset of the automation data is delivered to the client device via the requested operator interface screen.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as I/O modules including analog, digital, programmed/intelligent I/O modules, other programmable controllers, communications modules, sensors, actuators, output devices, and the like.

The network can include public networks such as the Internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 11:
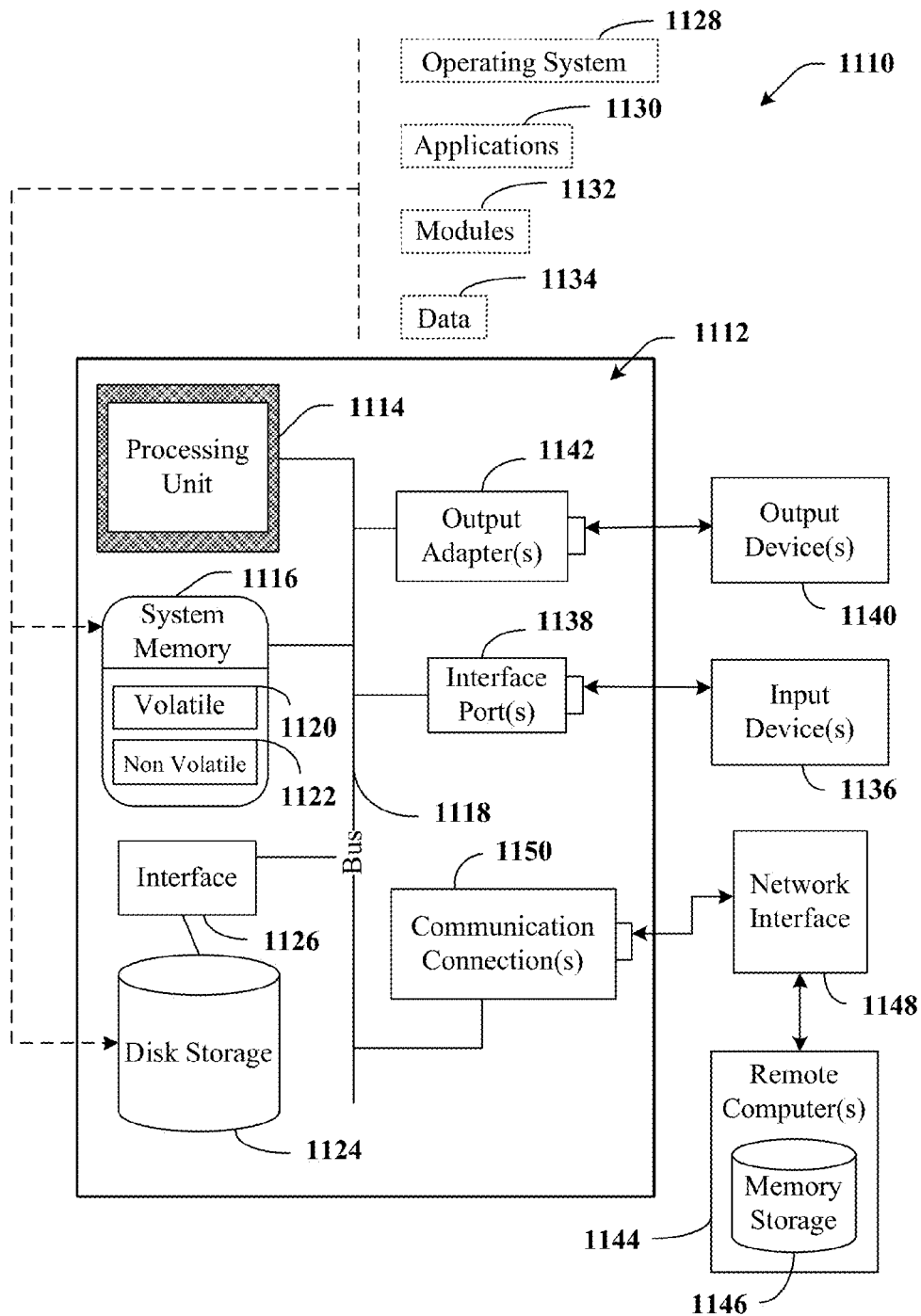
FIG. 11 is an example computing environment.
Figure 12:
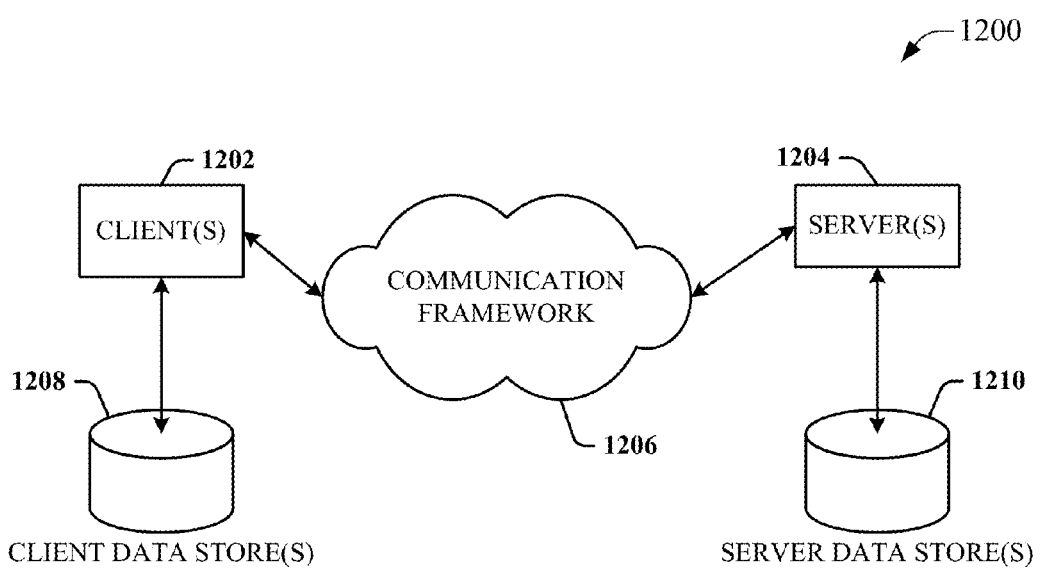
FIG. 12 is an example networking environment.

In order to provide a context for the various aspects of the disclosed subject matter, FIGS. 11 and 12 as well as the following discussion are intended to provide a brief, general description of a suitable environment in which the various aspects of the disclosed subject matter may be implemented.

With reference to FIG. 11, an example environment 1110 for implementing various aspects of the aforementioned subject matter includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable PROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that one or more embodiments of the subject disclosure can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

FIG. 12 is a schematic block diagram of a sample-computing environment 1200 with which the disclosed subject matter can interact. The system 1200 includes one or more client(s) 1202. The client(s) 1202 can be hardware and/or software (e.g., threads, processes, computing devices). The system 1200 also includes one or more server(s) 1204. The server(s) 1204 can also be hardware and/or software (e.g., threads, processes, computing devices). The servers 1204 can house threads to perform transformations by employing one or more embodiments as described herein, for example. One possible communication between a client 1202 and servers 1204 can be in the form of a data packet adapted to be transmitted between two or more computer processes. The system 1200 includes a communication framework 1206 that can be employed to facilitate communications between the client(s) 1202 and the server(s) 1204. The client(s) 1202 are operably connected to one or more client data store(s) 1208 that can be employed to store information local to the client(s) 1202. Similarly, the server(s) 1204 are operably connected to one or more server data store(s) 1210 that can be employed to store information local to the servers 1204

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

The invention claimed is:

1. A system that provides operator interface services using a cloud platform, comprising:
   a memory;
   a processor that executes computer-executable components stored in the memory to implement the system, the computer-executable components comprising:
      a gateway interface component configured to receive industrial data from an industrial system, wherein the gateway interface receives the industrial data on a cloud platform;
      a context component configured to add contextual metadata to at least a subset of the industrial data, wherein the contextual metadata comprises at least a hierarchical identification tag that identifies an origin of the subset of the industrial data within an industrial enterprise in terms of two or more hierarchical levels of the industrial enterprise, the two or more hierarchical levels comprising at least a plant facility level and a production area level; and
      a client interface component configured to send at least a subset of the industrial data from the cloud platform to a client device and render the subset of the industrial data on the client device based on the contextual metadata.

2. The system of claim 1, wherein the memory comprises cloud storage that stores a plurality of display screens, and the client interface component is configured to serve one or more of the display screens to the client device and to deliver at least the subset of the industrial data via the one or more of the display screens.

3. The system of claim 2, wherein the client interface component is further configured to, in response to receiving a request via one or more of the display screens to subscribe to an item of the industrial data corresponding to a performance metric of an industrial machine, add a real-time or near real-time data feed of the item of the industrial data to the one or more of the display screens.

4. The system of claim 1, wherein the memory comprises cloud storage that stores user profiles that define at least one of access privileges or preferences for respective users, and wherein the client interface component is further configured to control delivery of at least the subset of the industrial data based on the user profiles.

5. The system of claim 4, wherein the client interface component is further configured to receive customization input, from the client device, that specifies a display preference for the one or more display screens, and stores the customization input in a user profile, of the plurality of user profiles, corresponding to the client device.

6. The system of claim 1, wherein the contextual metadata further comprises at least one of a time, a date, a geographical location, a product, a machine status, an employee identifier, a lot number, or an active alarm.

7. The system of claim 1, further comprising an analytics component configured to at least one of aggregate one or more subsets of the industrial data or determine a correlation between one or more subsets of the industrial data based at least in part on the contextual metadata.

8. The system of claim 7, further comprising a notification component configured to, in response to a determination by the analytics component that a parameter associated with the industrial system has satisfied a defined condition, send a notification to a destination device.

9. The system of claim 1, wherein the client interface component is further configured to identify a type of the client device, and format the one or more display screens based in part on the type.

10. The system of claim 1, wherein the gateway interface component is configured to receive the industrial data from a cloud gateway device at a plant facility that collects the industrial data from the industrial system, and wherein the gateway interface component is further configured to send an instruction to the cloud gateway device instructing the cloud gateway device to change a frequency at which the cloud gateway device sends the data to the gateway interface component.

11. The system of claim 1, wherein the contextual metadata further comprises a production shift identifier.

12. A method for remotely monitoring an automation system, comprising:
   receiving, by a cloud-based system comprising at least one processor, industrial data from one or more automation systems;
   appending, by the cloud-based system, contextual information to at least a subset of the industrial data, wherein the contextual information comprises at least a hierarchical identification tag that specifies an origin of the subset of the industrial data within an industrial enterprise in terms of at least two hierarchical levels of the industrial enterprise, the at least two hierarchical levels comprising at least a plant facility level and a production area level;

serving, by the cloud-based system, an operator interface screen to a client device from the cloud platform in response to receiving a request from the client device for the subset of the industrial data; and displaying, by the cloud-based system, the subset of the industrial data on the client device via the operator interface screen in accordance with the contextual information.

13. The method of claim 12, further comprising storing, on cloud storage of the cloud-based system, a set of operator interface screens including the operator interface screen.

14. The method of claim 12, further comprising rendering the operator interface screen on the client device in accordance with one or more display preferences defined in a user profile associated with the client device.

15. The method claim 12, wherein the contextual information further comprises at least one of a time, a date, a geographical location, a product, a machine status, an employee identifier, a lot number, or an active alarm.

16. The method of claim 12, further comprising determining, by an analysis component that executes on the cloud-based system, a correlation between one or more subsets of the industrial data based in part on the contextual information.

17. The method of claim 12, wherein the receiving comprises receiving the industrial data from multiple industrial systems at respective different geographical locations.

18. The method of claim 12, further comprising delivering a notification via an Internet layer to a destination device in response to a determination that the industrial data has satisfied a defined criterion.

19. A non-transitory computer-readable medium having stored thereon computer-executable instructions that, in response to execution, cause a computing system to perform operations, the operations comprising:

interfacing with a cloud gateway associated with an industrial system;

receiving industrial data relating to the industrial system from the cloud gateway;

adding contextual metadata to at least a subset of the industrial data that identifies a source of the subset of the industrial data in terms of at least two hierarchical levels, the at least two hierarchical levels comprising at least a first level identifying a plant facility and a second level identifying a production area of the plant facility from which the subset of the industrial data was received;

interfacing with a client device over an Internet layer; and rendering at least a subset of the industrial data on the client device over the Internet layer based on the contextual metadata.

20. The non-transitory computer-readable medium of claim 19, wherein the rendering comprises serving an operator interface display to the client device over the Internet layer, and rendering at least the subset of the industrial data via the operator interface display.

* * * * *